United States Patent
Oami

(10) Patent No.: US 9,858,486 B2
(45) Date of Patent: Jan. 2, 2018

(54) DEVICE AND METHOD FOR DETECTING CIRCUMVENTING BEHAVIOR AND DEVICE AND METHOD FOR PROCESSING CAUSE OF CIRCUMVENTION

(71) Applicant: NEC Corporation, Tokyo (JP)

(72) Inventor: Ryoma Oami, Tokyo (JP)

(73) Assignee: NEC Corporation, Tokyo (JP)

( * ) Notice: Subject to any disclaimer, the term of this patent is extended or adjusted under 35 U.S.C. 154(b) by 43 days.

(21) Appl. No.: 15/035,516

(22) PCT Filed: Nov. 11, 2014

(86) PCT No.: PCT/JP2014/079889
§ 371 (c)(1),
(2) Date: May 10, 2016

(87) PCT Pub. No.: WO2015/068854
PCT Pub. Date: May 14, 2015

(65) Prior Publication Data
US 2016/0267330 A1   Sep. 15, 2016

(30) Foreign Application Priority Data

Nov. 11, 2013 (JP) .................................. 2013-233493

(51) Int. Cl.
*G06K 9/00* (2006.01)
*G06T 7/20* (2017.01)

(52) U.S. Cl.
CPC ............ *G06K 9/00778* (2013.01); *G06T 7/20* (2013.01)

(58) Field of Classification Search
CPC .............................. G06K 9/00778; G06T 7/20
USPC ......................................................... 382/103
See application file for complete search history.

(56) References Cited

U.S. PATENT DOCUMENTS 7,433,493 B1 * 10/2008 Miyoshi ............. G06K 9/00771
348/E7.087
2014/0219503 A1    8/2014 Watanabe et al.

FOREIGN PATENT DOCUMENTS

| JP | 2006-330942 | 12/2006 | |
| JP | 2006330942 A * | 12/2006 | ............... G06T 7/20 |
| JP | 2009-110152 | 5/2009 | |
| JP | 2010-72782 | 4/2010 | |
| WO | WO 02/21441 A1 | 3/2002 | |
| WO | WO 2013/057904 A1 | 4/2013 | |

OTHER PUBLICATIONS

Teng Li et al., "Crowded Scene Analysis: A Survey", Feb. 6, 2015, IEEE Transactions on XXX, vol. X, No. XX, p. 1-20, retrieved from Internet on Aug. 17, 2017, retrieved from URL:<https://arxiv.org/pdf/1502.01812.pdf>.*
A.J. Lipton, "Intelligent Video Surveillance in Crowds", [online], Object Video White Paper, [Searched Oct. 2, 2013], Internet , URL:http://www.objectvideo.com/component/docman/doc_download/150-white-paper-flow-control.html?Itemid=., file name , OV_WP_FlowControl.pdf., Mar. 2012.
International Search Report and Written Opinion dated Jan. 20, 2015, in corresponding PCT International Application.

* cited by examiner

*Primary Examiner* — Gregory F Cunningham
(74) *Attorney, Agent, or Firm* — Finnegan, Henderson, Farabow, Garrett & Dunner, L.L.P.

(57) ABSTRACT

A device (100) for detecting circumventing behavior includes an estimation unit (101) that estimates a degree of crowd congestion in relation to each of a plurality of partial areas of a target image, and a detection unit (102) that detects circumventing behavior of a crowd by using a distribution state and a temporal transition of the degree of congestion estimated by the estimation unit (101).

20 Claims, 15 Drawing Sheets

FIG. 10
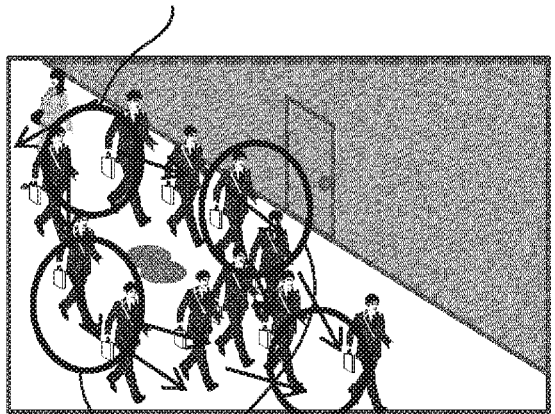
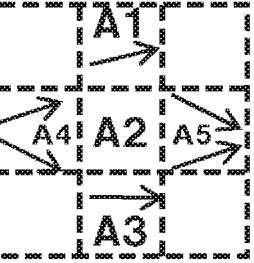
SEPARATING MOVEMENTS
JOINING PARTIAL AREA
PARTIAL AREAS
JOINING MOVEMENTS
PARALLEL (APPROXIMATELY PARALLEL) MOVEMENTS
SEPARATING PARTIAL AREA
DIRECTION OF MAJOR MOVEMENT IN EACH PARTIAL AREA

US 9,858,486 B2

DEVICE AND METHOD FOR DETECTING CIRCUMVENTING BEHAVIOR AND DEVICE AND METHOD FOR PROCESSING CAUSE OF CIRCUMVENTION

CROSS-REFERENCE TO RELATED PATENT APPLICATIONS

This application is a National Stage Entry of International Application No. PCT/JP2014/079889, filed Nov. 11, 2014, which claims priority from Japanese Patent Application No. 2013-233493, filed Nov. 11, 2013. The entire contents of the above-referenced applications are expressly incorporated herein by reference.

TECHNICAL FIELD

The present invention relates to a technique for analyzing people's behavior by using an image.

BACKGROUND ART

Various methods of analyzing a state of a person captured in a monitoring image by using the image have been proposed. These methods are used for prevention of crimes, prevention of disasters, detection of abnormalities, and the like.

The following Patent Document 1 proposes a method in which an input image is divided into partial regions, it is determined whether or not a person is present in each partial region by using movement information of the image and texture information of the image, and a trend of the flow rate of people or an abnormal crowding is determined based on the image. The following Non-Patent Document 1 proposes a method in which movements of pixels of video scenes are measured by using a technique called optical flow, and movements of the crowd are estimated. According to FIG. 6(a) of the following Patent Document 1, a movement for circumventing a specific region is estimated.

RELATED DOCUMENT

Patent Document

[Patent Document 1] Japanese Patent Application Laid-open Publication No. 2009-110152

Non-Patent Document

[Non-Patent Document 1] Alan J. Lipton, "Intelligent Video Surveillance in Crowds", [online], Object Video White Paper, [Published Mar. 8, 2012 (Data added)], [Searched Oct. 2, 2013], Internet <URL: http://www.object-video.com/component/docman/doc_download/150-white-paper-flow-control.html?Itemid=>, file name <OV_WP_FlowControl.pdf>

SUMMARY OF THE INVENTION

The method proposed in the above Patent Document 1 is for grasping the number of people captured in the image and not for analyzing people's behavior. On the other hand, in the method proposed in the above Non-Patent Document 1, movements of the crowd are analyzed based on movement information of pixels obtained by using the optical flow. In the proposed method, it is considered that the target of movement analysis is limited to a crowd of 100 or more people as illustrated in FIGS. 6(a), 6(b), and 6(c) of Non-Patent Document 1. Since the proposed method uses only movement information of an image, circumventing behaviors of the crowd may be detected in a case where a large amount of movement information is obtained. However, in the proposed method, in a case where the number of people captured in a single image is small (for example, less than twenty people), an amount of movement information is reduced, and, as a result, there is a probability that analysis accuracy may not be maintained.

A location where a crowd of 100 or more people is present is restricted to specific locations, and in addition, a monitoring camera is required to be determined to a considerably reduced angle of view. In a case where a suspicious person is monitored, it is necessary to identify features of the person in an image, and, thus, typically, an angle of view is determined so that the person is captured in an enlarged manner to some degree. In this case, it is hard to capture many people in a single image, and thus it is hard to apply the method proposed in Non-Patent Document 1. In addition, it is more difficult to apply the method in a location where the number of people is small, such as a general passage or road, or a room.

The present invention has been made in consideration of these circumstances, and provides a general-purpose technique of detecting circumventing behavior of a crowd by using an image.

In each aspect of the present invention, the following configurations are employed in order to solve the above-described problem.

A first aspect relates to a device for detecting circumventing behavior. The device for detecting circumventing behavior according to the first aspect includes: an estimation unit that estimates a degree of crowd congestion in relation to each of a plurality of partial areas of a target image; and a detection unit that detects circumventing behavior of a crowd by using a distribution state and a temporal transition of the degree of congestion estimated by the estimation unit.

A second aspect relates to a method for detecting circumventing behavior executed by at least one computer. The method for detecting circumventing behavior according to the second aspect includes estimating a degree of crowd congestion for each of a plurality of partial areas of a target image; and detecting circumventing behavior of a crowd by using a distribution state and a temporal transition of the estimated degree of congestion.

In addition, another aspect of the present invention may relate to a program causing at least one computer to execute the method for detecting circumventing behavior according to the second aspect, and may relate to a recording medium recording the program in a computer readable manner. The recording medium includes a non-transitory type medium.

According to each of the aspects, it is possible to provide a general-purpose technique of detecting circumventing behavior of a crowd by using an image.

BRIEF DESCRIPTION OF THE DRAWINGS

The above-described object, and other objects, features and advantages will become more apparent from preferred embodiments described below and the following drawings accompanying the embodiments.

FIG. 10 is a diagram illustrating examples of detour behaviors of a plurality of people and examples of movement information corresponding to the examples.

DESCRIPTION OF EMBODIMENTS

Hereinafter, embodiments of the present invention will be described. The embodiments described below are only examples, and the present invention is not limited to the following embodiments.

Figure 1:
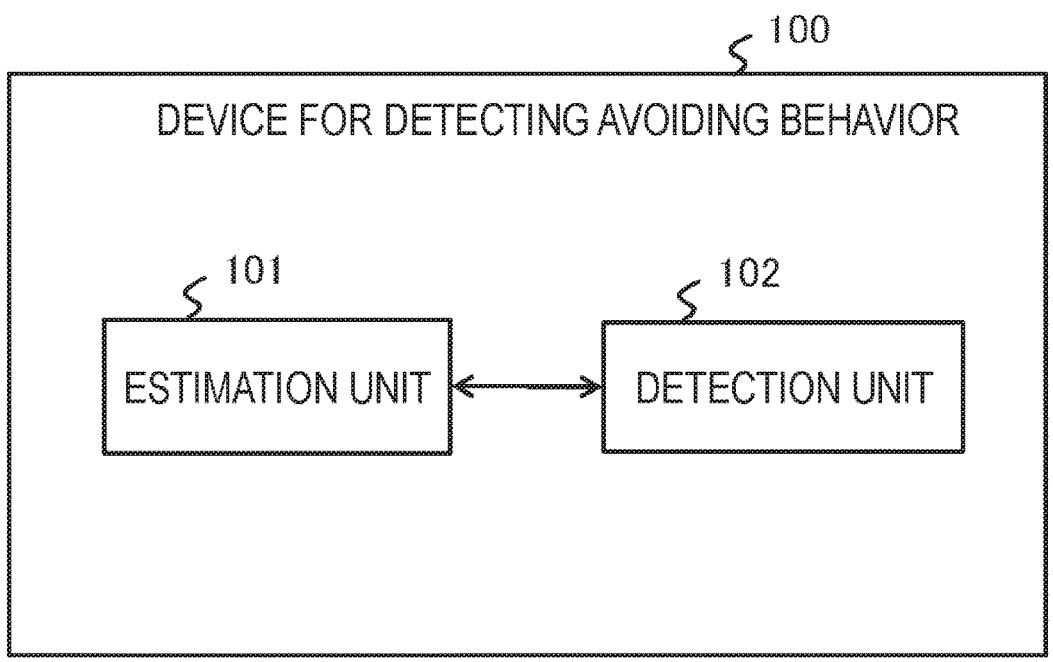
FIG. 1 is a diagram conceptually illustrating a processing configuration example of a device for detecting circumventing behavior in an embodiment of the present invention.

FIG. 1 is a diagram conceptually illustrating a processing configuration example of a device for detecting circumventing behavior in an embodiment of the present invention. As illustrated in FIG. 1, a device 100 for detecting circumventing behavior includes an estimation unit 101 which estimates a degree of crowd congestion in relation to each of a plurality of partial areas of a target image, and a detection unit 102 which detects circumventing behavior of a crowd by using a distribution state and a temporal transition of degrees of congestion estimated by the estimation unit 101.

The device 100 for detecting circumventing behavior illustrated in FIG. 1 has the same hardware configuration as that of, for example, a monitoring image analysis device 10 in specific embodiments which will be described later, and the above-described respective processing units are achieved by processing a program in the same manner as in the monitoring image analysis device 10.

In the embodiment of the present invention, the following method for detecting circumventing behavior is performed by at least one computer such as the device 100 for detecting circumventing behavior. The method for detecting circumventing behavior includes estimating a degree of crowd congestion in relation to each of a plurality of partial areas of a target image, and detecting circumventing behavior of a crowd by using a distribution state and a temporal transition of the estimated degrees of congestion. In addition, the embodiment of the present invention may be a program which causes at least one computer to execute the above-described method for detecting circumventing behavior, and may be a recording medium on which the program is recorded and which can be read by the computer.

As mentioned above, in the present embodiment, a degree of crowd congestion is estimated in relation to each of a plurality of partial areas of the target image (estimation unit 101). The target image is a still image captured from a video signal or a moving image file obtained by an imaging device. In addition, the target image is obtained by imaging a location where a person can move or stay. Hereinafter, such a location captured in the target image is referred to as a target detection location. In the present embodiment, a target detection location is not limited as long as a person can move or stay at the location. A target detection location may be, for example, a passage, a stair, a road, a station platform, a room, or a lobby. In the present embodiment, a target image capturing position is not limited as long as an image can be obtained by imaging a target detection location at a position where movements of a plurality of people can be identified, but a capturing position is preferably a position where a target detection location can be viewed from above. The target image may be generated by the device 100 itself for detecting circumventing behavior, and may be acquired from other devices.

Each of a plurality of partial areas is a partial image corresponding to a part of the target image. Each partial area may overlap other partial areas, and may not overlap other partial areas. In addition, the plurality of partial areas may be or may not be placed to cover the entire target image. In a case where the plurality of partial areas are placed not to cover the entire target image, there may be a location which does not adjoin to other partial areas around at least one partial area. Further, sizes and shapes of the respective partial areas may be the same as each other, and may be different from each other.

A degree of congestion of each partial area is an index value indicating the extent to which people are present in each partial area. The degree of congestion of each partial area may be indicated by the number of people captured in the partial area, may be indicated by the density obtained by dividing the number of people captured in the partial area by the size of the partial area, and may be indicated by a value obtained through computation using at least one of the number of people and the density. However, in the present embodiment, a method of estimating the number of people captured in a partial area is not limited. For example, a method using a technique of detecting a person's head from an image is used. In addition, a number-of-people estimator may be used in which a feature of an image containing a plurality of people which is cut into small regions (crowd patches) is collected by the number of people who are present, and is learned in a recurrent manner. In this case, the number of people included in a partial area is estimated by summing results obtained by applying the number-of-people estimator to the respective small regions of the image included in the partial area. However, in a case where the size of the partial area is the same as that of the small region, the final summing calculation is not necessary.

In the present embodiment, target images capturing scenes at respective times are sequentially acquired, and the above-described estimation of a degree of congestion for each partial area is performed on the respective target images which are sequentially acquired. In addition, in the present embodiment, circumventing behavior of a crowd is detected by using a distribution state and a temporal transition of the estimated degrees of congestion (detection unit 102). The distribution state of the degrees of congestion is a distribution state of degrees of congestion on a target image, indicated by a position of each partial area of the target image and a degree of congestion of each partial area. The temporal transition of the degree of congestion is a temporal transition of the degree of congestion for each partial area, estimated from each target image capturing a scene at each time.

By using the distribution state and the temporal transition of the degree of congestion for each partial area, trends of movements of a plurality of people in a target detection location captured in a target image can be obtained. It is possible to obtain movements of people in such cases as, for example, when at normal times, many people are present (moving or staying) across a target detection location, but from a certain point in time, the number of people present is reduced in only a specific partial area. Such movements of people may be estimated as behaviors for circumventing the specific partial area. In addition, through the estimation, the specific partial area may be specified as a location of the cause of circumvention in which the cause of the circumventing behavior is present.

Further, circumventing behavior of a crowd cannot be accurately detected by using only a temporal transition of a degree of congestion or only a distribution state of degrees of congestion like in the above description. In a case of using only the temporal transition of the degree of congestion, there is no differentiation between whether no people are present as a whole or no people are present in only a specific partial area. In addition, in a case of using only the distribution state of degrees of congestion, it cannot be specified whether or not no people are accidentally temporarily present in a specific partial area. In the present embodiment, it is possible to accurately detect circumventing behavior of a crowd by using both of a distribution state and a temporal transition of a degree of congestion for each partial area.

As mentioned above, according to the present embodiment, it is possible to detect circumventing behavior of a crowd by using an image. The detection of circumventing behavior of a crowd in the present embodiment can also be achieved by specifying a location of the cause of circumvention in which the cause of the circumventing behavior is present. When a location of the cause of circumvention is specified, it is considered that the circumventing behavior of a crowd has also been detected.

In the present embodiment, in order to detect circumventing behavior of a crowd, a distribution state and a temporal transition of a degree of congestion for each partial area estimated from an image are used. In the present embodiment, as long as a temporal transition of a degree of congestion and a state of a degree of congestion of the periphery can be identified, it is possible to detect circumventing behavior of a crowd even if the number of people captured in a target image is not large. Therefore, according to the present embodiment, it is possible to detect circumventing behavior of a crowd without depending on a target image when compared with a method using only temporary movement information. In other words, according to the present embodiment, it is possible to make detection of circumventing behavior of a crowd using an image widely applicable.

In the above-described embodiment, predefined behaviors other than a circumventing behavior may be detected. In this case, the estimation unit 101 estimates a degree of congestion of a partial region of an image, and the detection unit 102 detects a predefined behavior by using a temporal transition of degrees of congestion of a plurality of partial regions, estimated by the estimation unit 101. In this case, the device 100 for detecting circumventing behavior may be simply referred to as an information processing device.

Hereinafter, the embodiment will be described in more detail. Hereinafter, as specific embodiments including the content of the above-described embodiment, a monitoring image analysis device in a first embodiment and a second embodiment will be exemplified. Hereinafter, the same content as in the above-described embodiment will not be repeated as appropriate. However, the content of the following specific embodiments is not only applied to a monitoring image analysis device but can also be applied to all devices or systems detecting circumventing behavior of a crowd by using an image.

First Embodiment

[Device Configuration]

Figure 2:
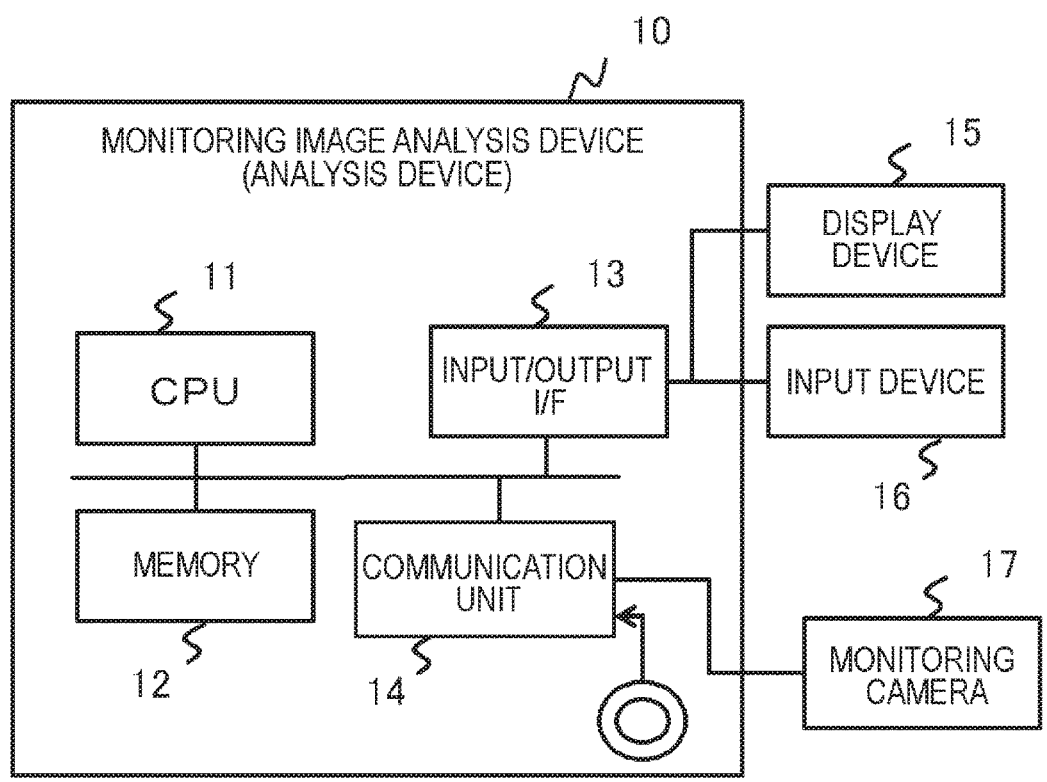
FIG. 2 is a diagram conceptually illustrating a hardware configuration example of a monitoring image analysis device (analysis device) in a first embodiment.

FIG. 2 is a diagram conceptually illustrating a hardware configuration example of a monitoring image analysis device (hereinafter, simply referred to as an analysis device in some cases) 10 in the first embodiment. The analysis device 10 is a so-called computer, and includes, for example, a central processing unit (CPU) 11, a memory 12, an input/output interface (I/F) 13, and a communication unit 14, connected to each other via a bus. The memory 12 is a random access memory (RAM), a read only memory (ROM), a hard disk, or the like. The communication unit 14 transmits and receives signals to and from other computers or apparatuses. In the first embodiment, the communication unit 14 is connected to a monitoring camera 17. The communication unit 14 acquires a video signal from the monitoring camera 17. In addition, the communication unit 14 may be connected to a portable recording medium or the like.

The monitoring camera 17 sends a video signal obtained by imaging a target detection location, to the communication unit 14. In FIG. 2, the single monitoring camera 17 is illustrated, but a plurality of monitoring cameras 17 may be connected to the communication unit 14.

The input/output I/F 13 is connectable to user interface devices such as a display device 15 and an input device 16. The display device 15 is a device which is, for example, a liquid crystal display (LCD) or a cathode ray tube (CRT) display, and displays a screen corresponding to drawing data processed by the CPU 11, a graphics processing unit (GPU) (not illustrated), or the like. The input device 16 is a device which is, for example, a keyboard or a mouse and receives an input operation from a user. The display device 15 and the input device 16 may be integrated with each other so as to achieve a touch panel. The analysis device 10 may additionally include other constituent elements which are not illustrated in FIG. 2. A hardware configuration of the analysis device 10 is not limited.

[Processing Configuration]

Figure 3:
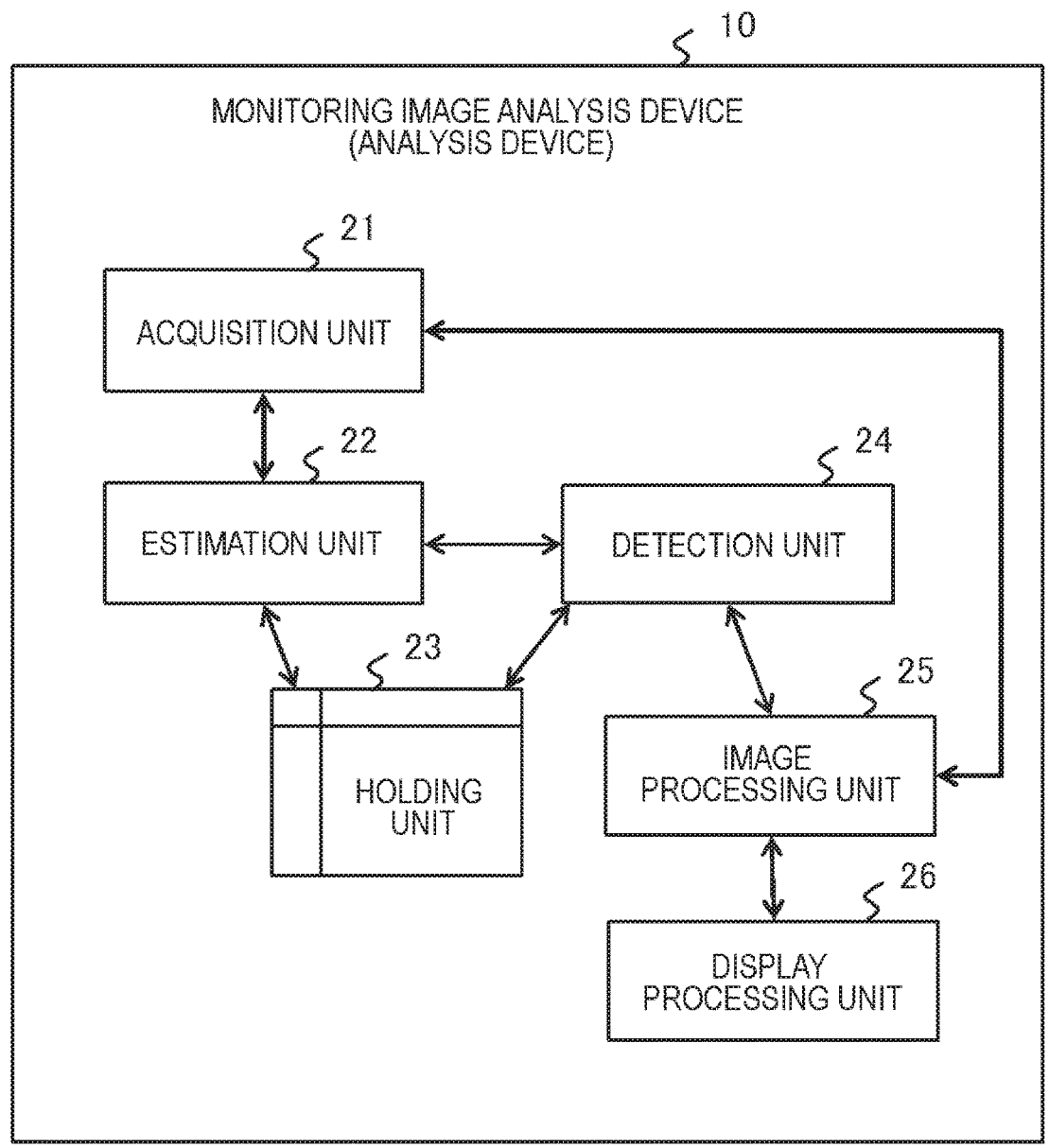
FIG. 3 is a diagram conceptually illustrating a processing configuration example of the monitoring image analysis device (analysis device) in the first embodiment.

FIG. 3 is a diagram conceptually illustrating a processing configuration example of the analysis device 10 in the first embodiment. As illustrated in FIG. 3, the analysis device 10 includes an acquisition unit 21, an estimation unit 22, a holding unit 23, a detection unit 24, an image processing unit 25, a display processing unit 26, and the like. These processing units are achieved, for example, by the CPU 11 executing a program stored in the memory 12. In addition, the program may be installed from a portable recording medium such as a compact disc (CD) or a memory card or from another computer on a network via the input/output I/F 13 or the communication unit 14, and may be stored in the memory 12.

The acquisition unit 21 acquires a monitoring image as the above-described target image. Specifically, the acquisition unit 21 sequentially acquires monitoring images by capturing a video signal from the monitoring camera 17 at any timing. Any timing is, for example, a predetermined cycle. In a case where the analysis device 10 is not connected to the monitoring camera 17, the acquisition unit 21 may acquire a monitoring image from a portable recording medium, other computers, or the like via the communication unit 14. For example, the acquisition unit 21 may acquire a monitoring image from an image storing/transmission device which temporarily stores an image captured by a camera and transmits the image, and may acquire a monitoring image from an image recorder which stores and reproduces an image.

The estimation unit 22 corresponds to the above-described estimation unit 101. The estimation unit 22 estimates a degree of crowd congestion in relation to each of a plurality of respective partial areas of the monitoring image which is sequentially acquired by the acquisition unit 21. The plurality of partial areas are the same as described above. For example, the estimation unit 22 specifies each partial area of a monitoring image by using predefined division information. In addition, the estimation unit 22 may specify a plurality of partial areas by sliding a predetermined window on a monitoring image at predetermined intervals.

A degree of congestion and a method of estimating the degree of congestion are the same as described above. For example, the estimation unit 22 estimates the number of people of each partial area by applying a crowd patch to a partial image of the partial area, and estimates a degree of congestion of each partial area by dividing the estimated number of people by the size (area) of the partial area. A method of detecting the heads of people has a problem in that the detection accuracy is reduced in a case where people overlap each other, or a person is located at a position which is too close to or distant from the monitoring camera 17, but, according to the method using the crowd patch, various scenes are learned, and thus it is possible to maintain the accuracy of estimating the number of people.

The estimation unit 22 causes a degree of congestion for each partial area estimated from the monitoring image which is sequentially acquired, to be held in the holding unit 23 in order. Consequently, the holding unit 23 holds the degree of congestion for each partial area as time-series data. For example, the holding unit 23 holds identification data of a partial area and a degree of congestion of the partial area in pairs in order of time.

The detection unit 24 detects a coexisting state of a target partial area which is continuously in a non-congested state with a degree of congestion lower than a threshold value and at least one of other partial areas not continuously in the non-congested state by using the time-series data of a degree of congestion for each partial area, held in the holding unit 23. Here, the target partial area may be a single partial area, and may be a plurality of partial areas. In addition, a non-congested state being continued indicates that the non-congested state occurs from a certain time in a certain partial area, and the non-congested state is also continued in the latest monitoring image. The coexistence of regions indicates that at least one of other partial areas not continuously in the non-congested state is present along with a target partial area while a non-congested state of the target partial area is continued. Hereinafter, such a state detected by the detection unit 24 is referred to as a circumventing behavior state in some cases. If such a circumventing behavior state is detected, the detection unit 24 may determine that circumventing behavior of a crowd occur.

The threshold value used to determine a non-congested state is determined based on a degree of congestion for each partial area at normal times. The threshold value may be held by the detection unit 24 in advance, may be information which is input by a user operating the input device 16 based on an input screen, and may be information which is acquired from a portable recording medium, other computers, and the like, via the communication unit 14.

There may be a case where a standard degree of congestion completely differs due to the month, the day, the day of the week, hours, a weekday, and a weekend depending on a target detection location. For example, in a case where a corridor of an office building is a target detection location, there are generally fewer people in hours of early morning or midnight than during work time. Similarly, in this target detection location, there are generally fewer people on weekends than on weekdays. For this reason, a threshold value used to determine a non-congested state is preferably determined based on the above-described standard degree of congestion in each predetermined time unit. In this case, the detection unit 24 determines a threshold value by using a standard degree of congestion corresponding to the time at which a monitoring image is captured, among standard degrees of congestion in the respective predetermined time units which are set in relation to a partial area of the monitoring image.

In addition, there may be a case where a standard degree of congestion differs for each partial area even in the same time unit depending on a target detection location. For example, in a case where there is a partial area (a location where an obstacle is present) which a person cannot enter, there is no person in the partial area. Further, in a case where a target detection location is a passage, there may be partial areas in which a person easily passes or likes to pass and partial areas not so depending on a distance to a destination. For this reason, a threshold value used to determine a non-congested state is preferably provided for each partial area. In this case, the standard degree of congestion in each predetermined time unit is set for each partial area of a monitoring image. In addition, the detection unit 24 determines a threshold value for each partial area by using a standard degree of congestion corresponding to a capturing time of the monitoring image and corresponding to each partial area among the standard degrees of congestion.

The standard degree of congestion indicates a standard degree of congestion in the time unit. For example, a statistical value of a degree of congestion such as an average degree of congestion, a most frequent degree of congestion, or a median of degrees of congestion in the time unit, or a value calculated by using the statistical value is used as the standard degree of congestion. The standard degree of congestion in each predetermined time unit may be held by the detection unit 24 in advance, may be information which is input through a user's operation, and may be information acquired from a portable recording medium, other computers, or the like. In addition, the detection unit 24 may calculate the threshold value by multiplying the standard degree of congestion by a predetermined ratio.

If a circumventing behavior as described above is detected, the detection unit 24 determines the target partial area as a location of the cause of circumvention in which the cause of the circumventing behavior is present. This is because, although at least one of other partial areas is not continuously in the non-congested state, the target partial area is continuously in a non-congested state, and thus it may be considered that a plurality of people behave so as to circumvent the target partial area.

Further, the detection unit 24 may detect a state in which a plurality of partial areas near the target partial area are not continuously in the non-congested state as the above-described circumventing behavior state. In this case, the detection unit 24 detects, as a circumventing behavior state, a coexisting state of the target partial area which is continuously in a non-congested state with a degree of congestion lower than a threshold value and at least one of other partial areas not continuously in the non-congested state. In the above-described manner, it is possible to detect a state in which people behave so as to clearly make a detour around only the target partial area in the target detection location, and thus to achieve detection of circumventing behavior of a crowd and specifying of a location of the cause of circumvention with high accuracy.

The detection unit 24 may detect the above-described circumventing behavior state by using the following methods. Hereinafter, a time prioritized method and a space prioritized method will be exemplified.

<Time Prioritized Method>

The detection unit 24 specifies a target partial area which is continuously in a non-congested state by using a temporal transition of a degree of congestion held in the holding unit 23, and then determines whether or not there is at least one of other partial areas not continuously in the non-congested state while the target partial area is continuously in the non-congested state.

Figure 4:
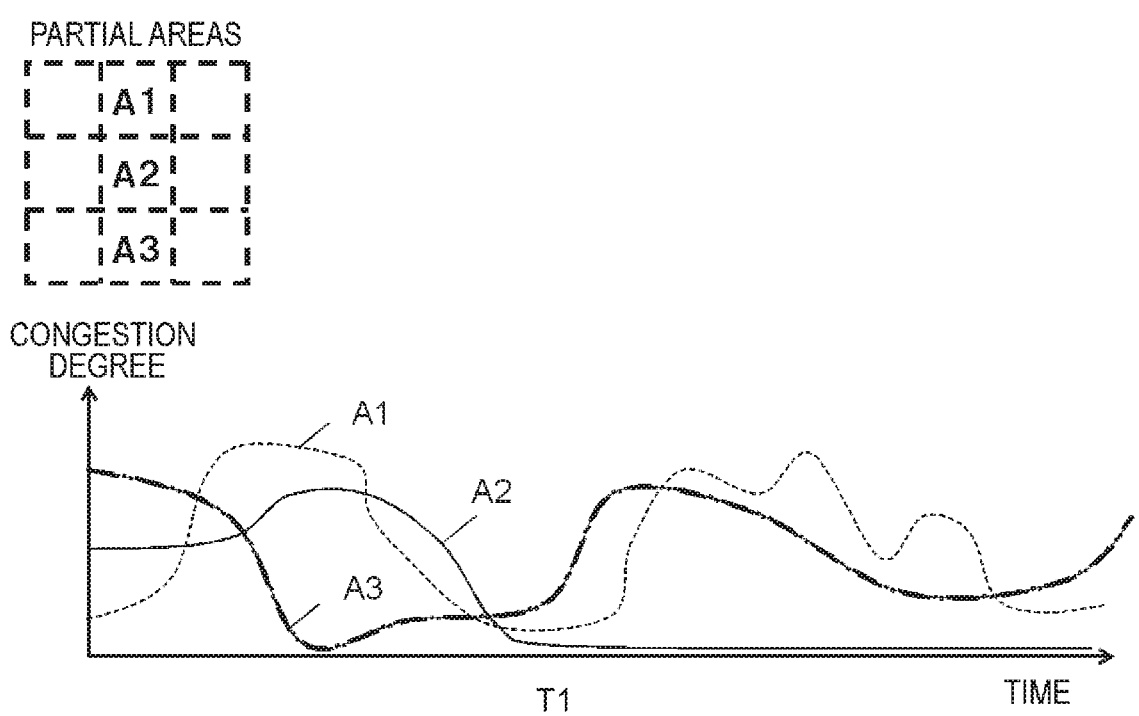
FIG. 4 is a diagram conceptually illustrating a time prioritized method in a method of detecting an circumventing behavior state.

FIG. 4 is a diagram conceptually illustrating the time prioritized method in the method of detecting a circumventing behavior state. According to FIG. 4, the detection unit 24 first specifies a partial area A2 exhibiting a continuous non-congested state after a time point T1 as a target partial area, and then finds partial areas A1 and A3 which are not in a continuous non-congested state after the time point T1. As a result, the detection unit 24 detects a circumventing behavior state. As mentioned above, the time prioritized method is a method of first finding a target partial area which is continuously in a non-congested state by using a temporal transition of a degree of congestion.

<Space Prioritized Method>

The detection unit 24 detects a coexistence of a partial area which is continuously in a non-congested state with a degree of congestion lower than a threshold value and at least one of other partial areas not continuously in the non-congested state based on a degree of congestion of each partial area at a certain time point, held in the holding unit 23, and then determines whether or not the partial area exhibiting the non-congested state is continuously in the non-congested state by using time-series data of the degree of congestion held in the holding unit 23.

Figure 5:
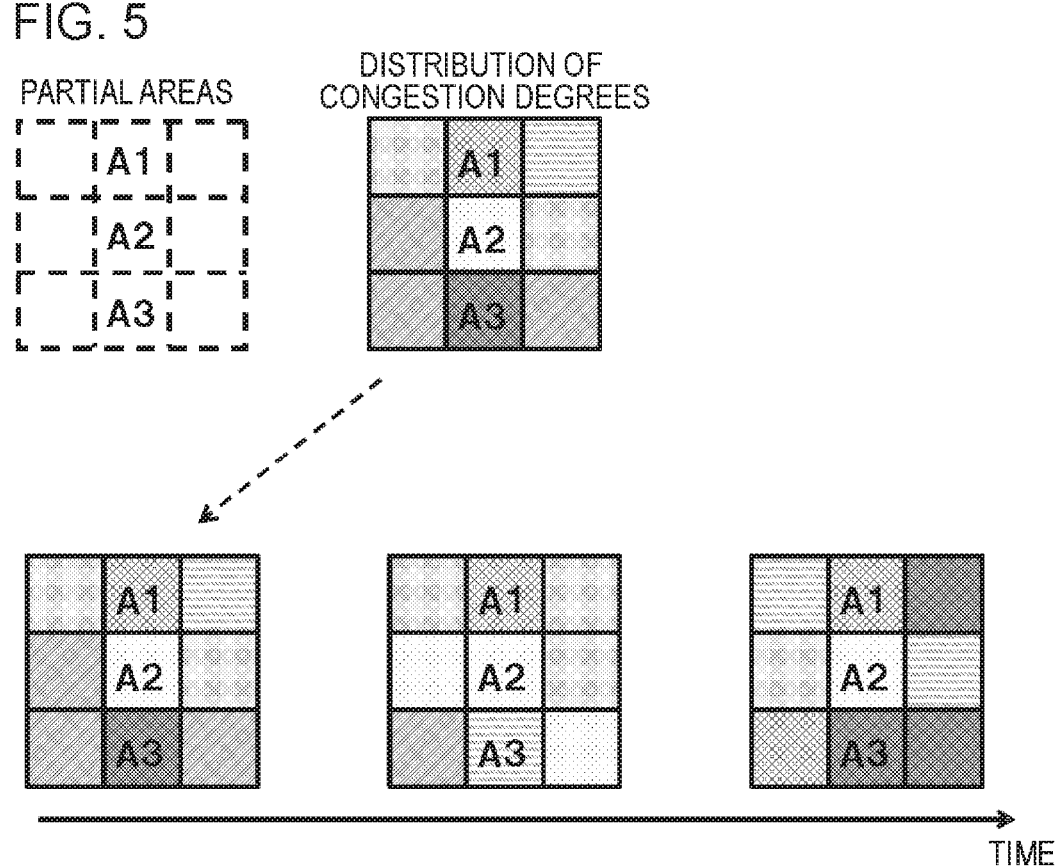
FIG. 5 is a diagram conceptually illustrating a space prioritized method in the method of detecting an circumventing behavior state.

FIG. 5 is a diagram conceptually illustrating the space prioritized method in the method of detecting a circumventing behavior state. According to FIG. 5, first, the detection unit 24 detects that a partial area A2 exhibiting a non-congested state and partial areas A1 and A3 exhibiting a congested state around the partial region A2 coexist with each other based on a degree of congestion of each partial area at a certain time point. Next, the detection unit 24 confirms that the partial area A2 is continuously in the non-congested state by using a temporal transition of the degree of congestion. As a result, the detection unit 24 detects a circumventing behavior state. As mentioned above, the space prioritized method is a method of first finding coexistence of a partial area exhibiting a non-congested state and other partial areas exhibiting a congested state by using a distribution state of a degree of congestion at a certain time point.

The image processing unit 25 attaches a display element with which a location of the cause of circumvention can be specified to a monitoring image based on position information of a partial area determined as the location of the cause of circumvention by the detection unit 24 in the monitoring image. Position information of each partial area in the monitoring image is held by, for example, the estimation unit 22 specifying a partial area. A display element attached by the image processing unit 25 is not limited as long as the display element can specify a location of the cause of circumvention. The display element is, for example, a line surrounding a periphery of a partial area determined as a location of the cause of circumvention, any mark (a point, a star, an exclamation mark, or the like) attached inside the partial area, and an arrow or a balloon indicating the partial area. In addition, an original monitoring image attached with the display element is a monitoring image acquired by the acquisition unit 21, and is one of a plurality of monitoring images indicating the above-described circumventing behavior state.

The display processing unit 26 displays the monitoring image to which the display element is attached by the image processing unit 25 on the display device 15.

Figure 6:
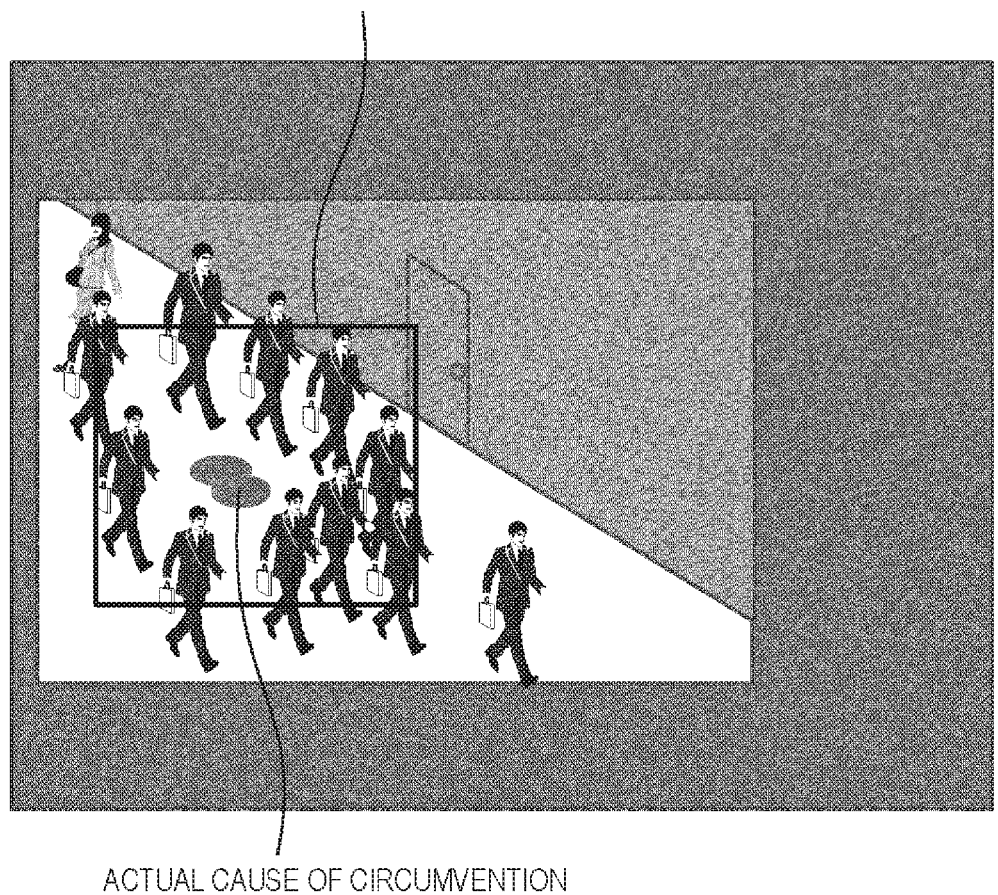
FIG. 6 is a diagram illustrating an example of a monitoring image attached with a display element with which a location of the cause of circumvention can be specified.

FIG. 6 is a diagram illustrating an example of a monitoring image attached with a display element with which a location of the cause of circumvention can be specified. According to the example illustrated in FIG. 6, an abnormal state which is an actual cause of circumvention occurs in a certain place of a passage which is a target detection location, and a partial area including the place is determined as a location of the cause of circumvention. However, in FIG. 6, the partial area corresponding to the location of the cause of circumvention detected by the detection unit 24 is not particularly clarified. A rectangular shape surrounding the location of the cause of circumvention is attached as a display element to the monitoring image illustrated in FIG. 6 by the image processing unit 25.

Operation Examples

Figure 7:
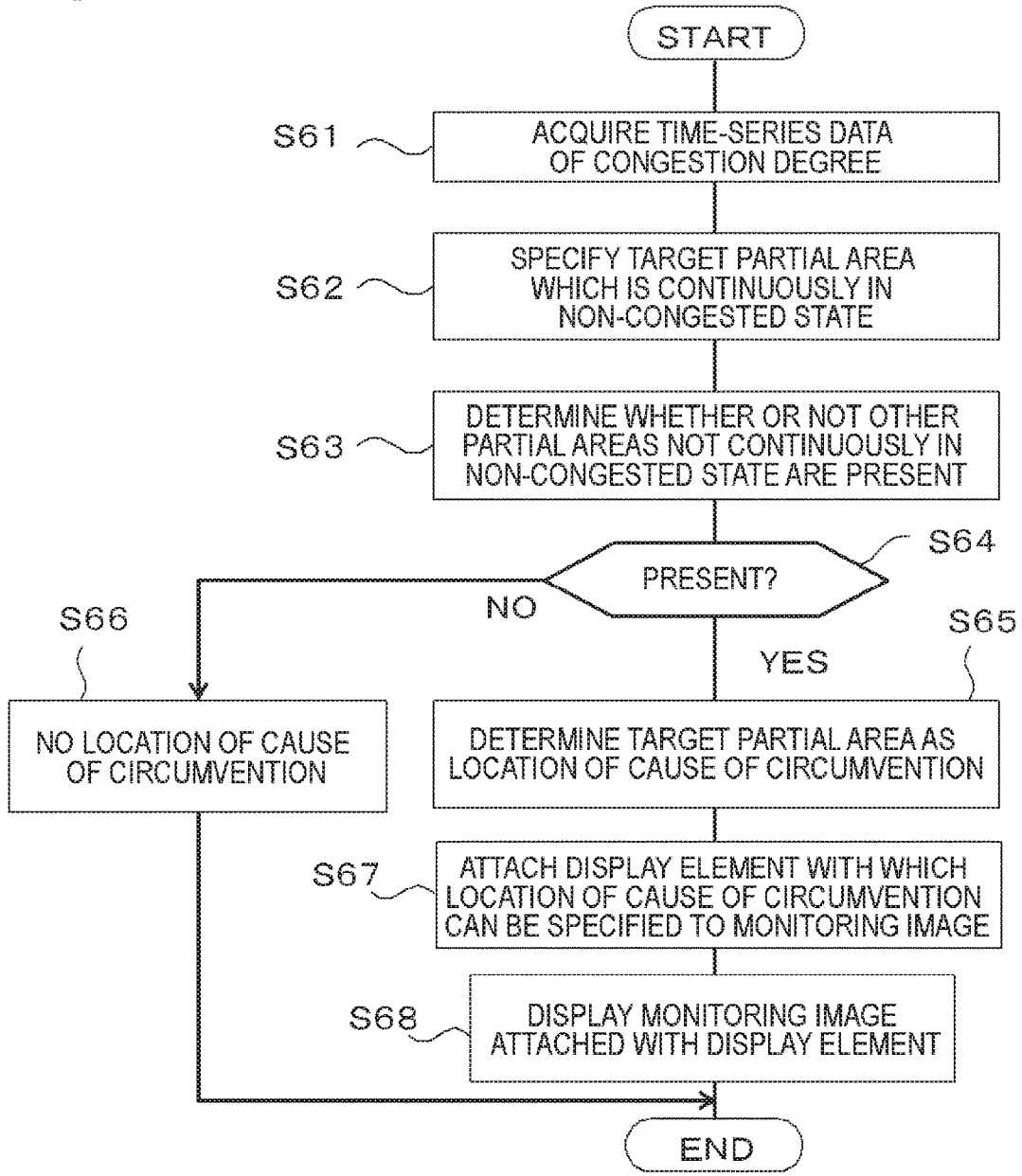
FIG. 7 is a flowchart illustrating an operation example (time prioritized method) of the monitoring image analysis device (analysis device) in the first embodiment.
Figure 8:
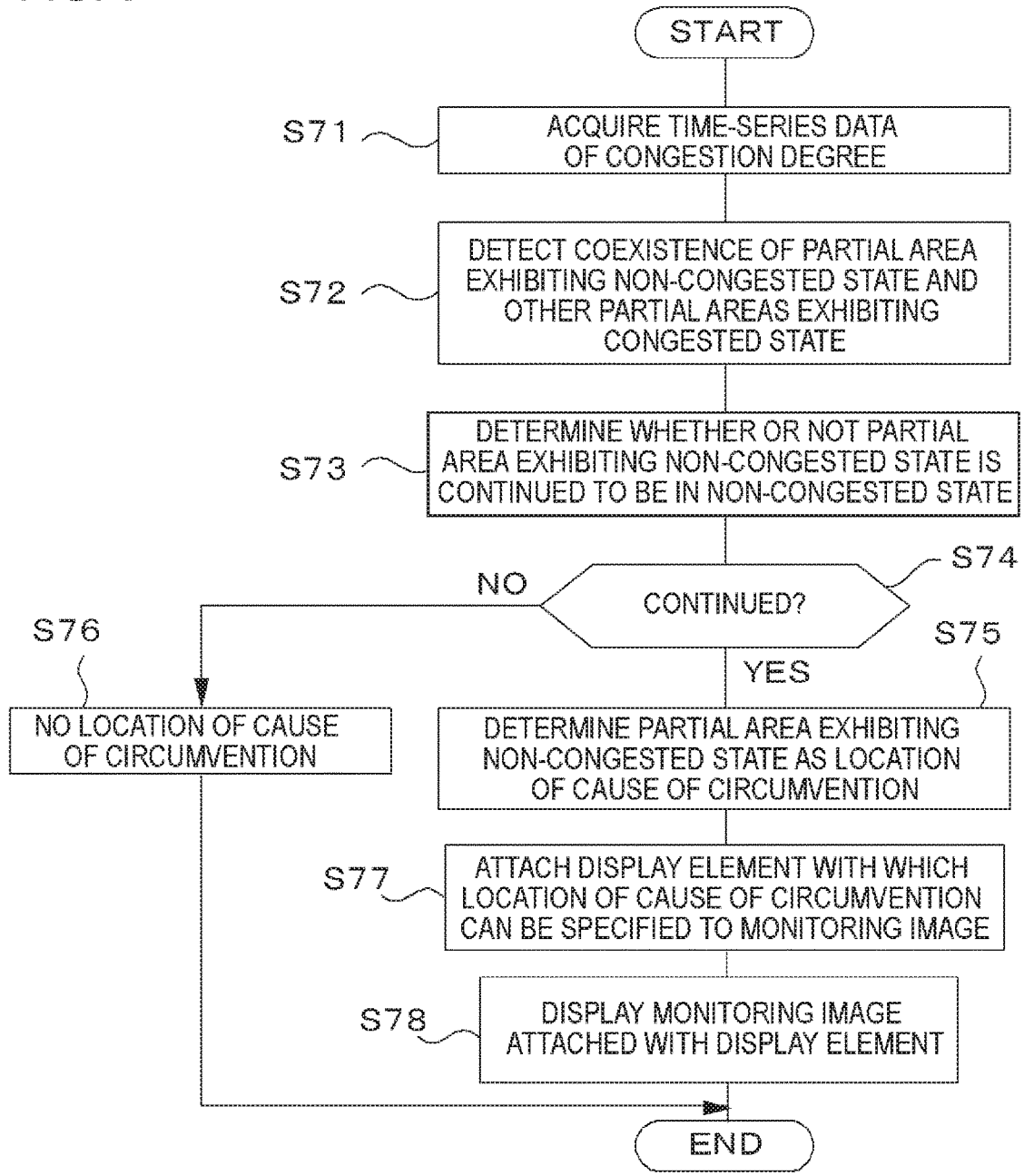
FIG. 8 is a flowchart illustrating an operation example (space prioritized method) of the monitoring image analysis device (analysis device) in the first embodiment.

FIGS. 7 and 8 are flowcharts illustrating operation examples of the analysis device 10 in the first embodiment. Particularly, FIG. 7 shows a processing flow for the time prioritized method, and FIG. 8 shows a processing flow for the space prioritized method. In the following description, the monitoring image analysis device 10 mainly performs the methods, but the above-described respective processing units included in the analysis device 10 may mainly perform the methods, and a plurality of computers may mainly perform the methods.

The analysis device 10 performs a process of acquiring time-series data of a degree of congestion for each partial area separately from the processing flows illustrated in FIGS. 7 and 8. Specifically, the analysis device 10 sequentially acquires monitoring images of which capturing times are different from each other, and estimates a degree of congestion for each partial area from each of the monitoring images which are sequentially acquired so as to hold the estimated degree of congestion for each partial area at anytime. The processing content is as described in relation to each processing unit of the analysis device 10. Consequently, the analysis device 10 already holds the time-series data of the degree of congestion for each partial area when executing the processing flows illustrated in FIGS. 7 and 8.

First, with reference to FIG. 7, a description will be made of a method of detecting a circumventing behavior in the first embodiment.

The analysis device 10 acquires time-series data of a degree of congestion for each partial area from the holding unit 23 (step S61).

The analysis device 10 specifies a target partial area which is continuously in a non-congested state with a degree of congestion lower than a threshold value among a plurality of partial areas of a monitoring image based on the acquired time-series data (step S62). A method of determining or acquiring a threshold value is the same as described above.

Next, the analysis device 10 determines whether or not there are other partial areas not continuously in the non-congested state while the target partial area specified in step S62 is continuously in the non-congested state (step S63).

If it is determined that there are other partial areas (YES in step S64), the analysis device 10 determines the target partial area specified in step S62 as a location of the cause of circumvention (step S65). In other words, in a case where the affirmative result (YES) is obtained in step S64, it is regarded that the analysis device 10 detects a circumventing behavior state and further detects circumventing behavior of a crowd.

On the other hand, if it is determined that there are no other partial areas (NO in step S64), such a non-congested state is also continued in all partial areas other than the target partial area, and thus the analysis device 10 determines that there is no location of the cause of circumvention (step S66). This determination is the same as determination of no circumventing behavior.

Next, the analysis device 10 attaches a display element, with which the location of the cause of circumvention can be specified, to the monitoring image based on position information of the partial area determined as the location of the cause of circumvention in step S65 in the monitoring image (step S67).

The analysis device 10 displays the monitoring image attached with the display element on the display device 15.

Next, with reference to FIG. 8, a description will be made of a method of detecting a circumventing behavior in the first embodiment.

Step S71 is the same as step S61 illustrated in FIG. 7.

The analysis device 10 detects that a partial area exhibiting a non-congested state and at least one of other partial areas exhibiting a congested state in which a degree of congestion is higher than a threshold value coexist with each other based on a degree of congestion of each partial area at a certain time point in the acquired time-series data (step S72).

Successively, the analysis device 10 determines whether or not the partial area exhibiting the non-congested state, detected in step S72, is continuously in the non-congested state based on the time-series data (step S73).

If it is determined that the non-congested state is continued (YES in step S74), the analysis device 10 determines the partial area exhibiting the non-congested state as a location of the cause of circumvention (step S75). In other words, in a case where the affirmative result (YES) is obtained in step S74, it is regarded that the analysis device 10 detects a circumventing behavior state and further detects circumventing behavior of a crowd.

On the other hand, if the non-congested state is not continued (NO in step S74), the partial area exhibiting the non-congested state is temporarily just in the non-congested state, and thus the analysis device 10 determines that there is no location of the cause of circumvention (step S76). This determination is the same as determination of no circumventing behavior.

Thereafter, steps S77 and S78 are the same as steps S67 and S68 illustrated in FIG. 7.

Operations and Effects of First Embodiment

As described above, in the first embodiment, monitoring images of which capturing times are different from each other are sequentially acquired, a degree of congestion for each partial area is estimated in relation to each of the monitoring images, and time-series data of the degree of congestion for each partial area is held. It is possible to obtain a distribution state of the degree of congestion in the monitoring image and a temporal transition of the degree of congestion by using the time-series data of the degree of congestion for each partial area. In the first embodiment, based on the time-series data, a coexisting state of a target partial area which is continuously in a non-congested state and at least one of other partial areas not continuously in the non-congested state is detected as a circumventing behavior state, and the target partial area is determined as a location of the cause of circumvention through the detection. As mentioned above, according to the first embodiment, it is possible to detect circumventing behavior of a crowd and to also specify a location of the cause of circumventing behavior in relation to a target detection location captured in a monitoring image.

The above-described circumventing behavior state can be detected by using either of the method (time prioritized method) of first finding a target partial area which is continuously in a non-congested state by using a temporal transition of a degree of congestion, and the method (space prioritized method) of first finding the existence of a partial area exhibiting a non-congested state and other partial areas exhibiting a congested state by using a distribution state of degrees of congestion at a certain time point.

In addition, in the first embodiment, a threshold value used to determine a non-congested state of each partial area may be determined by using a standard degree of congestion corresponding to the time at which a monitoring image is captured. Further, a threshold value for each partial area may be determined by using a standard degree of congestion corresponding to a capturing time of the monitoring image and corresponding to each partial area. As mentioned above, in the first embodiment, a non-congested state is determined based on a temporal trend or a spatial trend regarding the presence of a person in a target detection location. Therefore, it is possible to increase the accuracy in which a partial area determined as being in a non-congested state is a location of the cause of circumvention, to reduce the number of candidates of the location of the cause of circumvention, and further to reduce a processing load.

In addition, in the first embodiment, in a case where a location of the cause of circumvention is found, a monitoring image attached with a display element with which the location of the cause of circumvention can be specified is displayed. Consequently, a person viewing the monitoring image can immediately specify the occurrence of circumventing behavior of a crowd and a location where the cause of the circumventing behavior is present. Such a display form of a monitoring image in the first embodiment is completely different from a form (reference form) in which an abnormal person or an abnormal thing is detected, and the detected person or thing is focused on. In the reference form, a detection target is a person or a thing, and the detection target is focused on without change, but, in the first embodiment, a detection target is not an object such as a person or a thing, and is a partial area in a target detection location, found from a peripheral state such as a circumvention (detour) behavior of a person, and does not have a boundary with another object. According to the first embodiment, such a target which is hard to specify can be specified by using position information of a partial area in a monitoring image, and, further, the specified target can be displayed by attaching a display element, with which the target can be specified, thereto.

Second Embodiment

In the second embodiment, movement information of an image is further used in addition to a distribution state and a temporal transition of a degree of congestion in order to detect a circumventing behavior and a location of the cause of circumvention. Hereinafter, an analysis device 10 according to the second embodiment will be described focusing on the configuration which is different from the content of the first embodiment. In the following description, the same content as in the first embodiment will not be repeated as appropriate.

Figure 9:
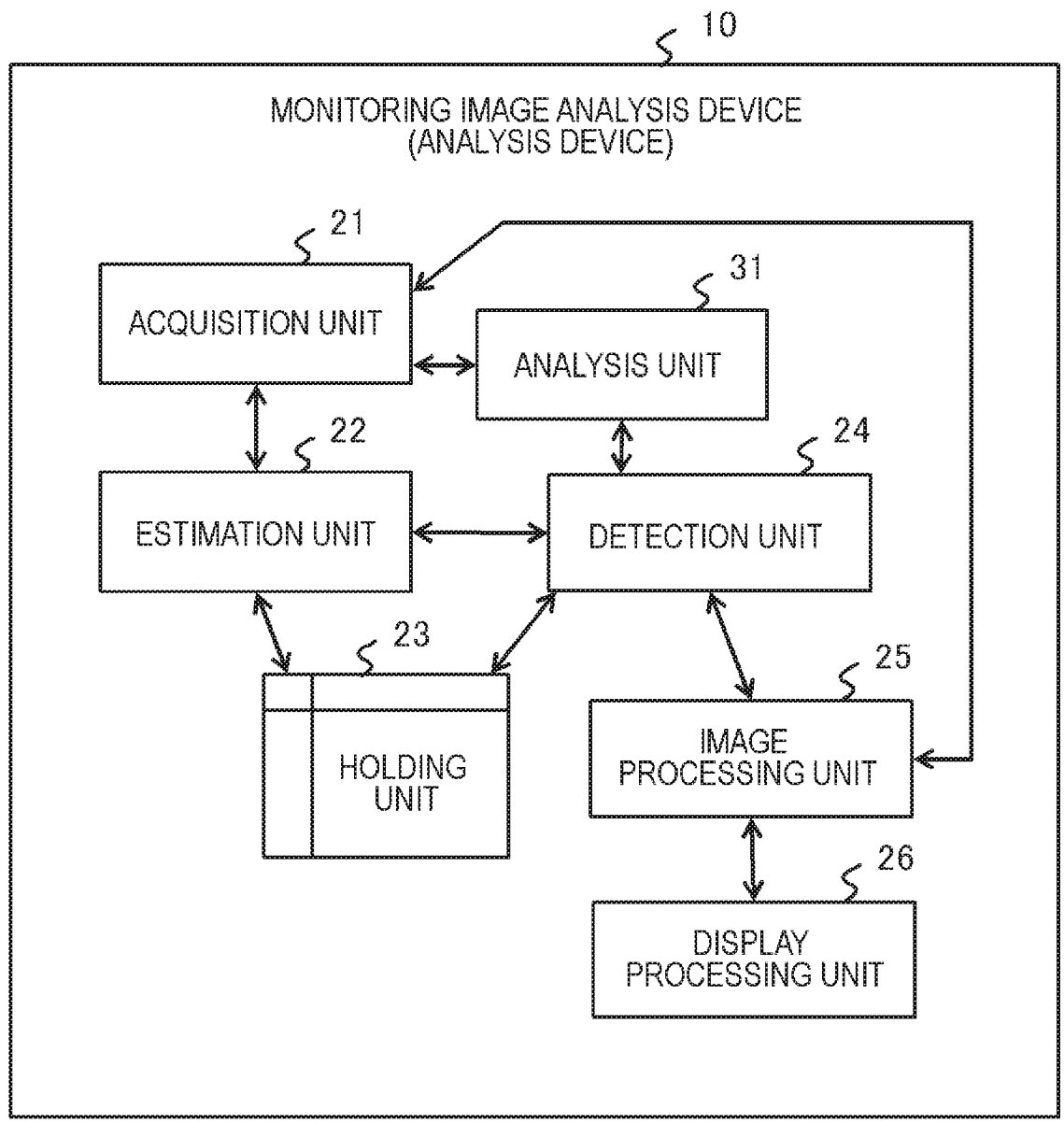
FIG. 9 is a diagram conceptually illustrating a processing configuration example of a monitoring image analysis device (analysis device) in a second embodiment.

FIG. 9 is a diagram conceptually illustrating a processing configuration example of the analysis device 10 according to the second embodiment. As illustrated in FIG. 9, the analysis device 10 further includes an analysis unit 31 in addition to the configuration of the first embodiment. The analysis unit 31 is also achieved by the CPU 11 executing the program stored in the memory 12 in the same manner as other processing units.

The analysis unit 31 analyzes movement in monitoring images which are sequentially acquired by the acquisition unit 21. Specifically, the analysis unit 31 measures movement of a pixel between monitoring images by using a well-known technique such as the optical flow disclosed in the above PTL 1 and NPL 1. Alternatively, the analysis unit 31 may use a value obtained by averaging the optical flow calculated as mentioned above in a time direction for each location. In the second embodiment, a specific method of analyzing movement in the analysis unit 31 is not limited.

The detection unit 24 determines the above-described location of the cause of circumvention by further using movement information obtained by the analysis unit 31. Circumventing behavior of a crowd detected in each embodiment are behaviors for circumventing a certain specific location (location of the cause of circumvention), and may have a high probability that parallel movements are exhibited at facing positions with the location of the cause of circumvention interposed therebetween. In addition, the circumventing behavior includes an action of changing a course taken hitherto in front of the location of the cause of circumvention, that is, a detour behavior. Further, the detour behavior may include an action of changing a course taken hitherto in front of a location of the cause of circumvention and of changing the course again after passing the location of the cause of circumvention.

FIG. 10 is a diagram illustrating examples of detour behaviors of a plurality of people and examples of movement information corresponding to the examples. In the examples illustrated in FIG. 10, movements of changing course taken hitherto in front of a location of the cause of circumvention (movements of being divided in a plurality of directions in front of the location of the cause of circumvention), parallel movements at facing positions with the location of the cause of circumvention interposed therebetween, and movements of changing course again after passing the location of the cause of circumvention (movements of joining from a plurality of directions while leaving behind the location of the cause of circumvention) are exhibited as detour behaviors. Consequently, movement directions in partial areas A1 and A3 which face each other with a partial area A2 of the location of the cause of circumvention interposed therebetween are parallel to each other; movements of being divided in a plurality of directions are exhibited in a partial area A4 (a separating partial area A4); and movements of joining from a plurality of directions are exhibited in a partial area A5 (a joining partial area A5). The detection unit 24 in the second embodiment detects circumventing behaviors including such detour behaviors by using the movement information so as to determine the location of the cause of circumvention.

Specifically, in the same manner as in the first embodiment, the detection unit 24 may use a method (degree of congestion prioritized method) in which a location of the cause of circumvention is determined by using a distribution state and a temporal transition of a degree of congestion, and a final location of the cause of circumvention is determined by using the movement information based on the determination result, and may use a method (movement prioritized method) in which a location of the cause of circumvention is determined by using the movement information, and a final location of the cause of circumvention is determined by using a distribution state and a temporal transition of a degree of congestion based on the determined result. Further, the detection unit 24 may separately perform determining of a location of the cause of circumvention using a distribution state and a temporal transition of a degree of congestion and determining of a location of the cause of circumvention using movement information, and may determine a final location of the cause of circumvention based on each determination result. In this case, the detection unit 24 may calculate a likelihood indicating that a circumventing behavior is likely to be performed for each determination result, calculate a comprehensive likelihood by multiplying the likelihoods, and perform detection of a final circumventing behavior and determination of a final location of the cause of circumvention based on the comprehensive likelihood.

<Degree of Congestion Prioritized Method>

The detection unit 24 determines whether or not movement directions in other partial areas which face each other with a target partial area interposed therebetween are parallel to each other based on movement information obtained by the analysis unit 31 by using position information regarding the target partial area determined as a location of the cause of circumvention in a monitoring image according to the method in the first embodiment, and determines the target partial area as a final location of the cause of circumvention by using the determination result. The detection unit 24 determines major movement directions based on a histogram of movement directions in relation to each of other partial areas which face each other with the target partial area interposed therebetween, and determines whether or not the movement directions are parallel to each other. The parallel movement directions include not only a relationship of being completely parallel but also a relationship of being approximately parallel. Specifically, for example, an angle between vectors indicating major movement directions may be calculated, and the movement directions may be determined as being close to parallel if the angle is equal to or lower than a predetermined value. In addition, an inner product between unit vectors indicating major movement directions may be calculated, and the movement directions may be determined as being close to parallel if the inner product is equal to or larger than a predetermined value. The detection unit 24 determines a target partial area as a final location of the cause of circumvention in a case where movement directions are parallel to each other, and determines whether or not the target partial area is not a location of the cause of circumvention in a case where the movement directions are not parallel to each other.

The detection unit 24 may determine a location of the cause of circumvention based on the presence or absence of at least one of the division partial area and the joining partial area illustrated in FIG. 10 in addition to the above-described determination, instead of the determination, or along with the determination. In this case, the detection unit 24 determines whether or not partial areas other than a target partial area, which are not continuously in the non-congested state, include at least one of a separating partial area exhibiting a plurality of directions of movements of separating as the target partial area is being approached, and a joining partial area exhibiting a plurality of directions of movements of joining while leaving behind the target partial area, based on movement information acquired by the analysis unit 31. If at least one of the separating partial area and the joining partial area is present, the detection unit 24 may determine the target partial area as a location of the cause of circumvention. The detection unit 24 may determine the target partial area as a location of the cause of circumvention only in a case where movement directions in partial areas which face each other with the target partial area interposed therebetween are parallel to each other and at least one of the separating partial area and the joining partial area is present. In addition, determination of whether or not the above-described movements occur in the separating partial area and the joining partial area may be performed by collecting movement information in the partial areas for a certain period of time so as to obtain directions of movements of which frequencies are high, and determining whether or not the movements match the corresponding movements. Alternatively, conversely, determination of no movement of moving to a detour region or movement of moving from the detour region may be made through collection of the movement information for a certain period of time. In this case, as long as the occurrence of a movement of moving to a neighboring region or a movement of moving from the neighboring region can be identified, a separating partial area and a joining partial area can be determined with higher accuracy.

<Movement Prioritized Method>

In this method, the detection unit 24 detects a coexisting state of a still region and parallel movement regions in which movement directions at facing positions with the still region interposed therebetween are parallel to each other in a monitoring image by using movement information acquired by the analysis unit 31, and confirms that a partial area corresponding to the still region is continuously in a non-congested state. The detection unit 24 determines the partial area corresponding to the still region as a location of the cause of circumvention in a case where the confirmation is obtained, and determines that there is no location of the cause of circumvention in a case where the confirmation is not obtained.

The still region is a partial region of a monitoring image in which the magnitude of movement is less than a predetermined value. The detection unit 24 may detect a still region and parallel movement regions by using the partial areas, and may detect the regions in a region which is different from the partial areas. In a case of using a partial area, the detection unit 24 may determine movement information for each partial area. In addition, in a case of using a region which is different from a partial area, the detection unit 24 may detect, as a still region, a maximum partial region whose area is larger than a first predetermined area and magnitude of movement is less than a predetermined value. In this case, the detection unit 24 may detect, as parallel movement regions, maximum partial regions whose area is larger than a second predetermined area and in which movement directions at facing positions with the still region interposed therebetween are parallel to each other.

Also in this method, the detection unit 24 may determine a location of the cause of circumvention based on the presence or absence at least one of the separating partial area and the joining partial area illustrated in FIG. 10. Specifically, the detection unit 24 detects a coexisting state of a still region and at least one of a separating region exhibiting directions of movements of separating as the still region is being approached and a joining region exhibiting directions of movements of joining while leaving behind the still region around the still region in a monitoring image by using movement information, confirms that a partial area corresponding to the still region is continuously in a non-congested state, and determines the partial area corresponding to the still region as a location of the cause of circumvention based on the checking result. A method of detecting a separating region and a joining region is the same as the method of detecting a still region and a parallel movement region except for movement directions thereof.

Operation Examples

Figure 11:
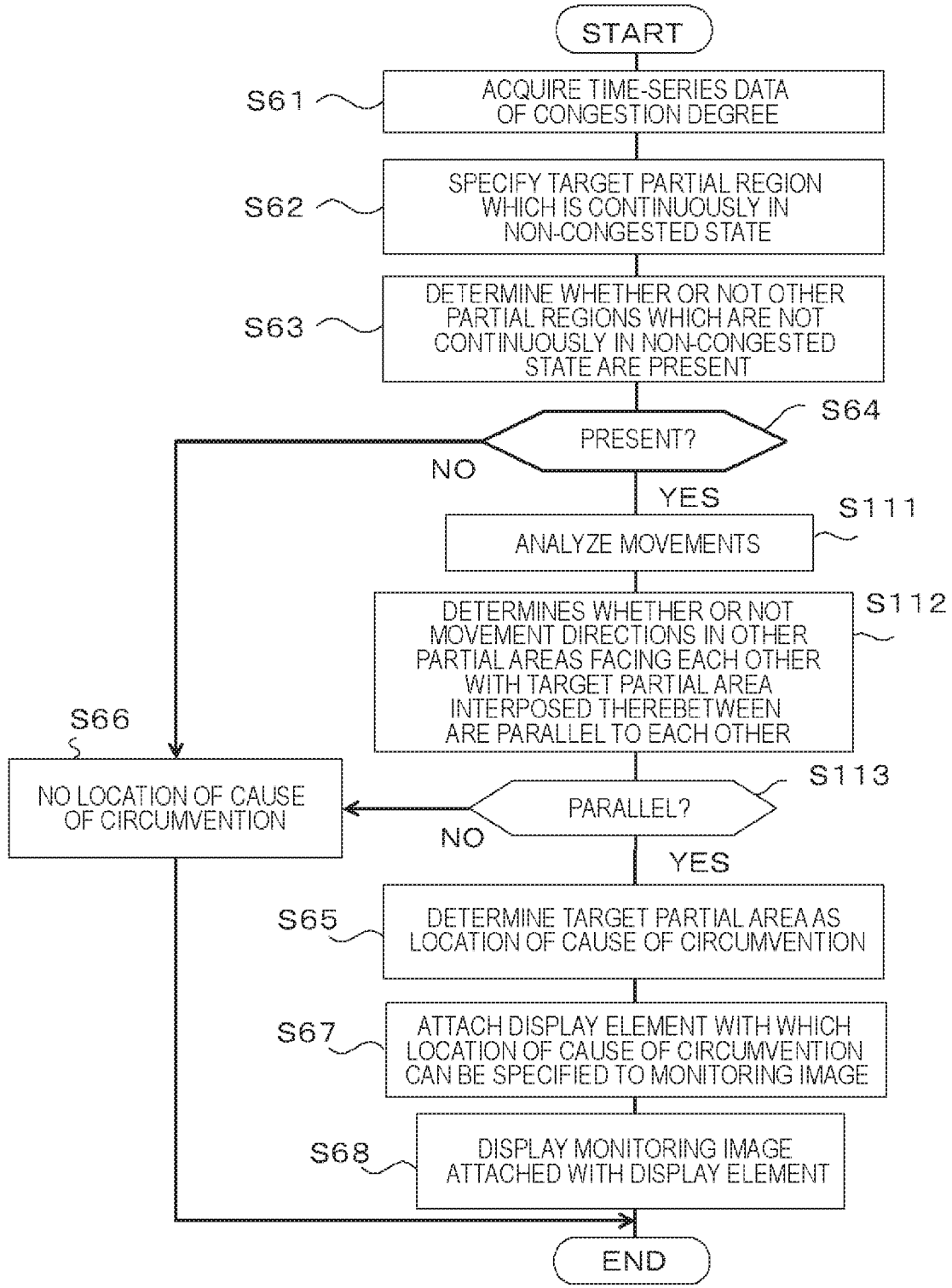
FIG. 11 is a flowchart illustrating an operation example (degree of congestion prioritized method) of the monitoring image analysis device (analysis device) in the second embodiment.
Figure 12:
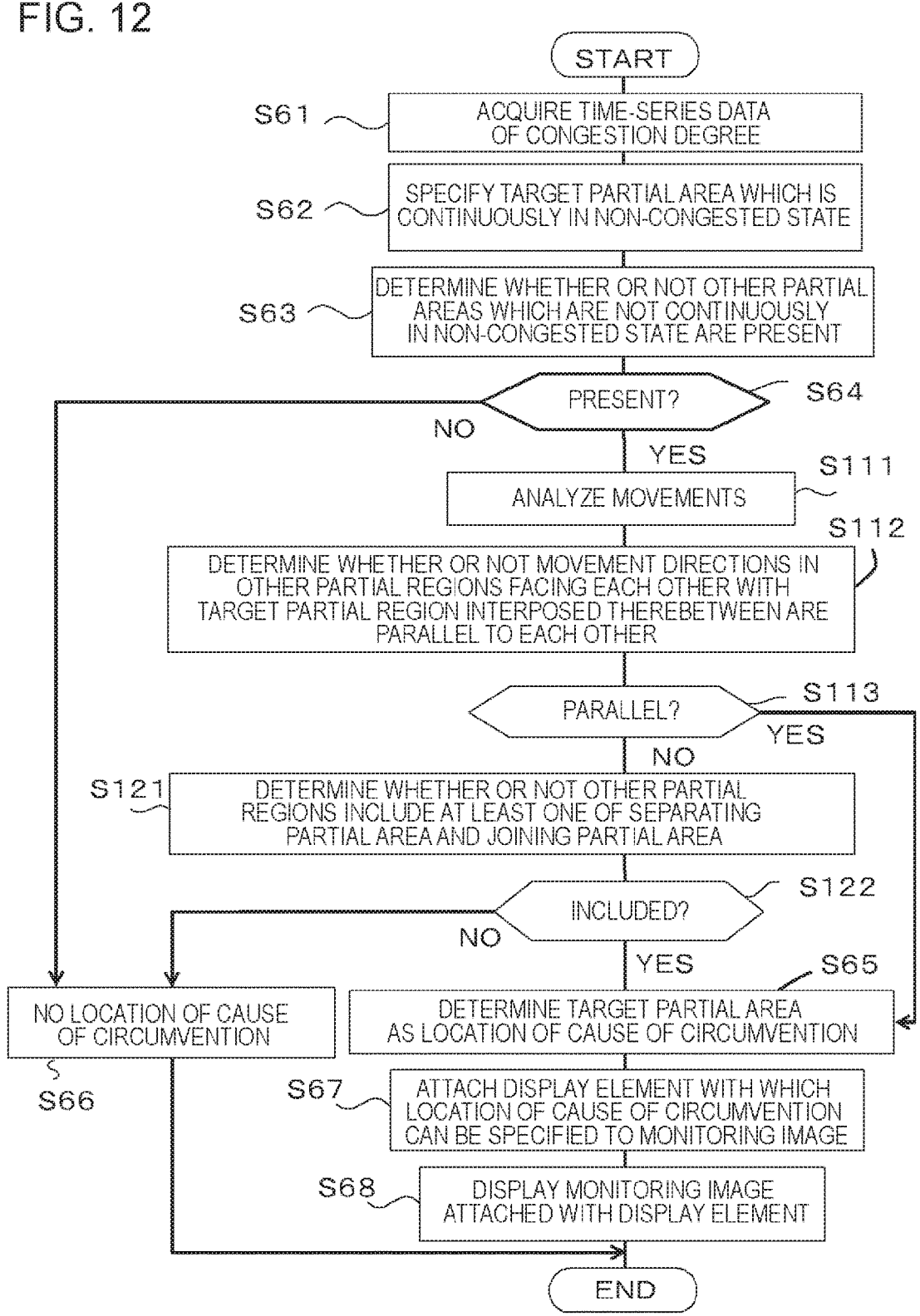
FIG. 12 is a flowchart illustrating an operation example (degree of congestion prioritized method) of the monitoring image analysis device (analysis device) in the second embodiment.
Figure 13:
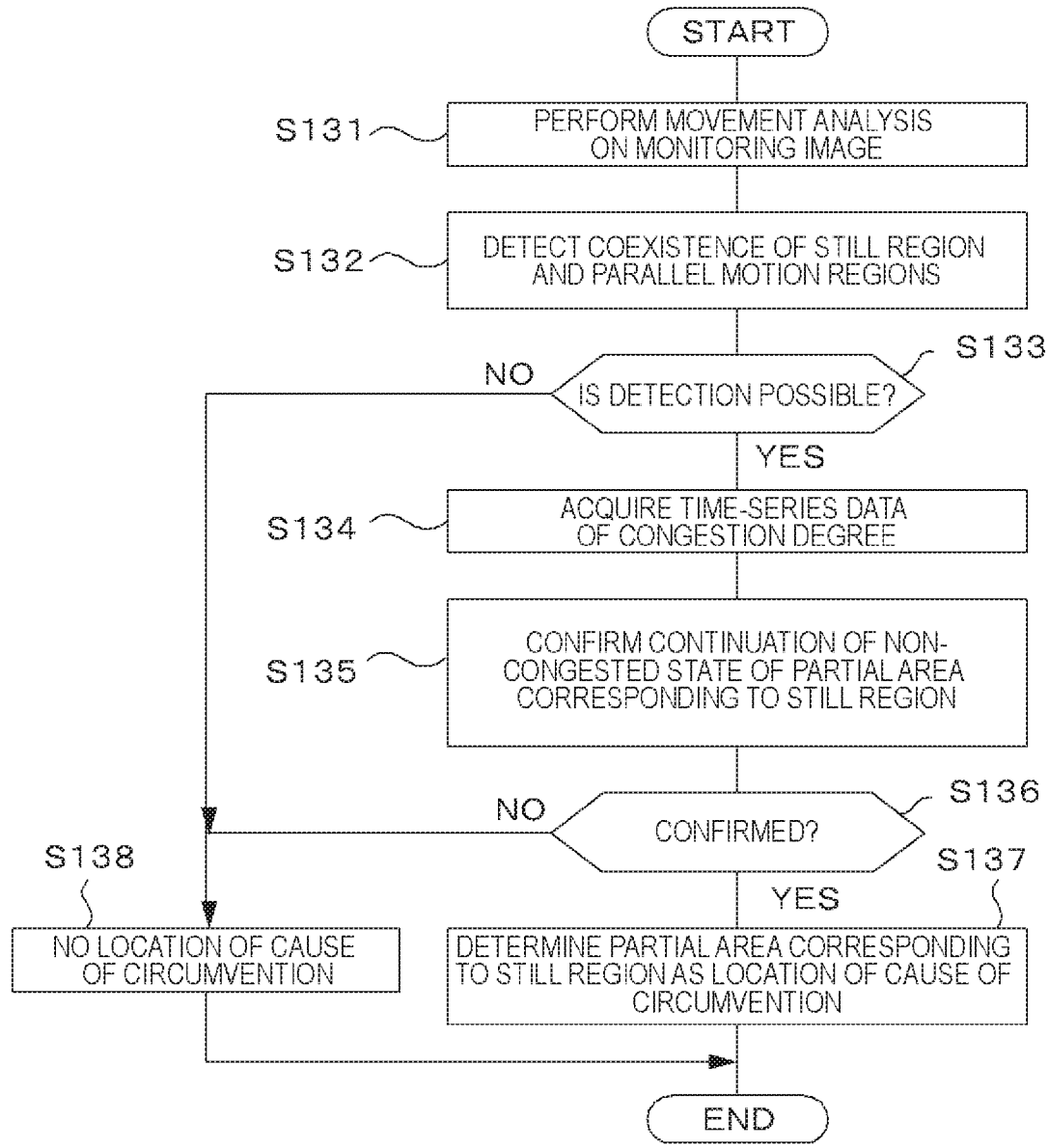
FIG. 13 is a flowchart illustrating an operation example (movement prioritized method) of the monitoring image analysis device (analysis device) in the second embodiment.

FIGS. 11, 12 and 13 are flowcharts illustrating operation examples of the analysis device 10 according to the second embodiment. Particularly, FIGS. 11 and 12 show a processing flow for the degree of congestion prioritized method, and FIG. 13 shows a processing flow for the movement prioritized method. In the following description, the monitoring image analysis device 10 mainly performs the methods, but the above-described respective processing units included in the analysis device 10 may mainly perform the methods, and a plurality of computers may mainly perform the methods.

In FIGS. 11 and 12, steps S61, S62, S63, S64, S66, S67 and S68 are respectively the same as the steps of the time prioritized method illustrated in FIG. 7. In the second embodiment, the respective steps may be replaced with steps S71, S72, S73, S74, S76, S77 and S78 illustrated in FIG. 8.

First, with reference to FIG. 11, a description will be made of detecting a circumventing behavior in the second embodiment.

If the above-described circumventing behavior state is detected based on time-series data of a degree of congestion for each partial area, acquired from the holding unit 23 (YES in step S64), the analysis device 10 performs step S111 and the subsequent steps.

The analysis device 10 analyzes movement in monitoring images which are sequentially acquired (step S111). As a method of analyzing movement in an image, a well-known technique such as the optical flow is used as described above. Here, the analysis device 10 may perform movement analysis on only pixels included in other partial areas facing each other with the target partial area specified in step S62 interposed therebetween.

The analysis device 10 determines whether or not movement directions in the other partial areas facing each other with the target partial area specified in step S62 interposed therebetween are parallel to each other (step S112). The parallel movement directions include not only a relationship of being completely parallel but also a relationship of being approximately parallel.

If it is determined that the motion directions are not parallel to each other (NO in step S113), the analysis device 10 determines that there is no location of the cause of circumvention (step S66). If it is determined that the motion directions are parallel to each other (YES in step S113), the analysis device 10 determines the target partial area as a location of the cause of circumvention (step S65).

Next, with reference to FIG. 12, a description will be made of detecting a circumventing behavior in the second embodiment. In FIG. 12, steps S121 and S122 are further executed in addition to the steps illustrated in FIG. 11. In this case, if it is determined that movement directions in the other partial areas facing each other with the target partial area specified in step S62 interposed therebetween are not parallel to each other (NO in step S113), the analysis device 10 determines whether or not partial areas other than the target partial area include at least one of a separating partial area and a joining partial area (step S121). Details of the separating partial area and the joining partial area are the same as described above.

If it is determined that at least one of the separating partial area and the joining partial area is included (YES in step S122), the analysis device 10 determines the target partial area as a location of the cause of circumvention (step S65). On the other hand, if it is determined that at least one is not included (NO in step S122), the analysis device 10 determines that there is no location of the cause of circumvention (step S66).

As mentioned above, according to the method in FIG. 12, if one of the determination in step S112 and the determination in step S121 is affirmative determination (YES in step S113 or YES in step S122), the target partial area is determined as a location of the cause of circumvention. Consequently, even in a case where parallel movements do not occur at facing positions with a location of the cause of circumvention interposed therebetween as in a case where an actual cause of circumvention is generated beside a wall of a passage, it is possible to detect circumventing behavior of a crowd and also to determine a location of the cause of circumvention by detecting movements of joining from a plurality of directions while leaving behind the location of the cause of circumvention or movements of separating in a plurality of directions as the location of the cause of circumvention is being approached, the movements indicating some detour behaviors.

However, in the second embodiment, the target partial area may be determined as a location of the cause of circumvention only in a case where both of the determination in step S112 and the determination in step S121 are affirmative determination (YES in step S113 and YES in step S122). In the above-described manner, since the target partial area is determined as a location of the cause of circumvention only in a case where a clear detour behavior is detected as movement information, detection accuracy of a circumventing behavior and a location of the cause of circumvention is improved.

Next, with reference to FIG. 13, a description will be made of detecting a circumventing behavior in the second embodiment. In the method illustrated in FIG. 13, movement information in monitoring images is first examined.

The analysis device 10 analyzes movement in monitoring images which are sequentially acquired (step S131). This is the same as in step S111 illustrated in FIGS. 11 and 12.

The analysis device 10 detects a coexisting state of a still region and parallel movement regions in which movement directions at facing positions with the still region interposed therebetween are parallel to each other in a monitoring image by using the movement information acquired in step S131 (step S132). Details of the still region and the parallel movement regions are the same as described above.

If the coexistence of the still region and the parallel movement regions is not detected (NO in step S133), the analysis device 10 determines that there is no location of the cause of circumvention (step S138). On the other hand, if the coexistence of the still region and the parallel movement regions is detected (YES in step S133), the analysis device 10 acquires time-series data of a degree of congestion for each partial area from the holding unit 23 (step S134).

The analysis device 10 confirms that a partial area corresponding to the still region is continuously in a non-congested state based on the acquired time-series data (step S135). The analysis device 10 determines the partial area corresponding to the still region as a location of the cause of circumvention (step S137) in a case where the confirmation is obtained (YES in step S136), and determines that there is no location of the cause of circumvention (step S138) in a case where the confirmation is not obtained (NO in step S136).

In FIG. 13, the coexistence of the still region and the parallel movement regions is detected, but, as illustrated in FIG. 12, the coexistence of the still region and at least one of the separating region and the joining region may be further detected.

Operations and Effects of Second Embodiment

As described above, in the second embodiment, movement information in an image is further used in addition to a distribution state and a temporal transition of a degree of congestion, and thus a circumventing behavior and a location of the cause of circumvention are detected. A circumventing behavior including a detour behavior as illustrated in FIG. 10 is identified by using the movement information in an image. Specifically, it is determined whether or not there are partial regions (parallel movement regions or other partial areas) exhibiting movement directions which are parallel to each other at facing positions with a certain specific partial region (a still region or a target partial area) interposed therebetween. In addition, it is determined whether or not there is at least one of a partial region (a separating region or a separating partial area) exhibiting a plurality of directions of movements of separating as the specific partial region is being approached, and a partial region (a joining region or a joining partial area) exhibiting a plurality of directions of movements of joining while leaving behind the specific partial region.

As mentioned above, according to the second embodiment, movement information in an image is further used, and thus it is possible to improve detection accuracy of a circumventing behavior and a location of the cause of circumvention.

Modification Examples

In the above-described respective embodiments, the display device 15 is connected to the analysis device 10, but the display device 15 may be connected to another device, and may display a screen based on image data sent from the analysis device 10. Similarly, the monitoring camera 17 may also be connected to another device.

Hereinafter, the above-described embodiments will be described in more detail by using Example. In the following Example, a description will be made of a specific example of a monitoring image attached with a display element with which a location of the cause of circumvention can be specified.

Example

Figure 14:
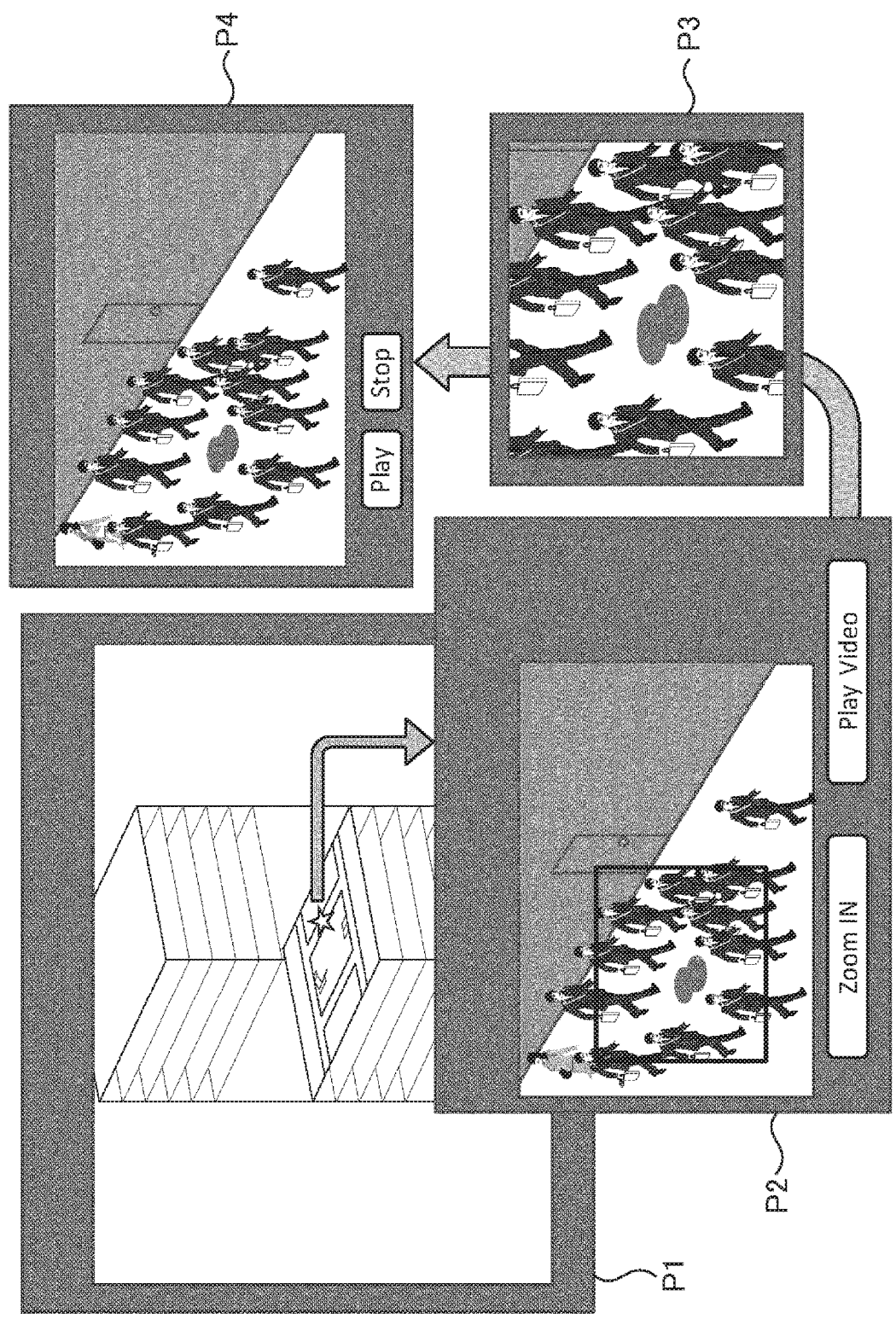
FIG. 14 is a diagram illustrating a specific example of a monitoring image attached with a display element with which a location of the cause of circumvention can be specified.

FIG. 14 is a diagram illustrating a specific example of a monitoring image attached with a display element with which a location of the cause of circumvention can be specified. In Example, the analysis device 10 stores information indicating each target detection location of a plurality of monitoring cameras 17, and displays, on the display device 15, an image P1 in which a specific display element (a star mark in FIG. 14) is attached to a position corresponding to a target detection location where circumventing behavior of a crowd are detected. A person viewing the image P1 can understand that there is something causing the circumventing behavior at the position to which the specific display element is attached.

When a user's operation of selecting the specific display element is detected, the analysis device 10 displays a monitoring image P2 attached with a display element with which a location of the cause of circumvention can be specified on the display device 15. A rectangular shape surrounding the location of the cause of circumvention is attached to the monitoring image P2 as a display element in the same manner as in FIG. 6. A person viewing the image P2 can immediately understand a location of the cause of circumvention by viewing the rectangular shape.

In addition, in the present example, when a user's operation of selecting a moving image reproduction (Play Video) button of the monitoring image P2 is detected, the analysis device 10 displays, on the display device 15, a screen P4 on which a current moving image video of the monitoring camera 17 capturing the monitoring image P2 is played. Further, when a user's operation of selecting a zoom-in button for the monitoring image P2 is detected, the analysis device 10 causes the monitoring camera 17 which can image a location of the cause of circumvention to zoom in on the location of the cause of circumvention. In the above-described manner, the location of the cause of circumvention can be checked in more detail.

Figure 15:
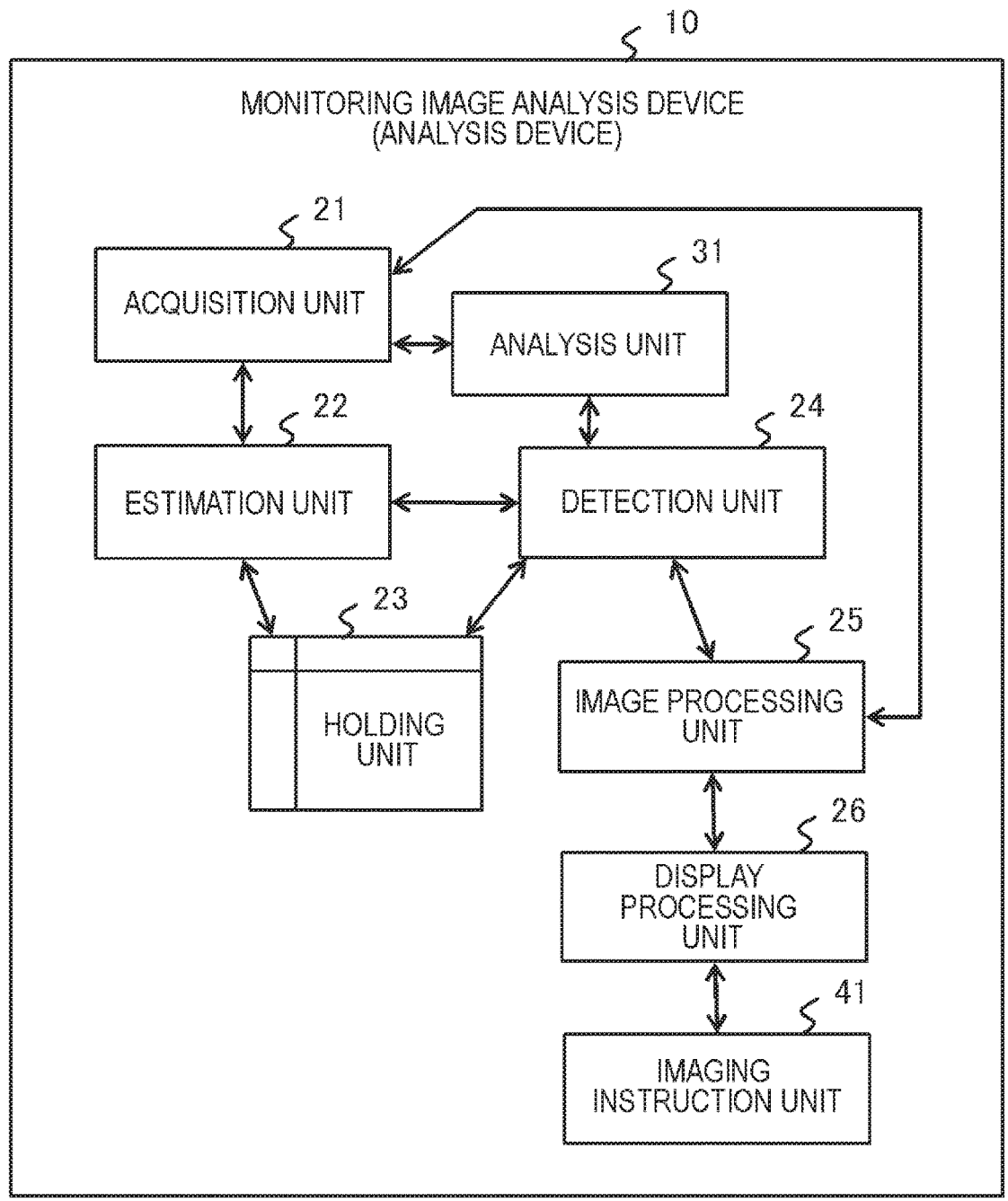
FIG. 15 is a diagram conceptually illustrating a processing configuration of a monitoring image analysis device (analysis device) in Example.

FIG. 15 is a diagram conceptually illustrating a processing configuration of the analysis device 10 in Example. The analysis device 10 in Example further includes an imaging instruction unit 41 which causes the monitoring camera 17 which can image a location of the cause of circumvention, to zoom in on the location of the cause of circumvention in response to a user's operation on a monitoring image displayed on the display device 15, in addition to the above-described configuration of the second embodiment.

The imaging instruction unit 41 is also achieved in the same manner as other processing units.

As exemplified in the image P2 of FIG. 14, there is a probability that the location of the cause of circumvention may be included in or may overlap the region where the circumventing behavior is occurring. Therefore, the analysis device 10 can also attach an indicator indicating a region where an circumventing behavior is occurring to an image (image processing unit 25), and can display the image attached with the indicator on the display device 15 (display processing unit 26).

In addition, the plurality of steps (processes) are described in order in the plurality of flowcharts used for the above description, but the order of steps to be executed in the present embodiment is not limited to the described order. In the present embodiment, the order of the illustrated steps may be changed within the scope of not causing any hindrance to the content thereof. In addition, the above-described respective embodiments and modification examples may be combined with each other within the scope of not causing any contradiction to the content thereof.

Some or all of the above-described respective embodiments, Example, and modification examples may also be specified as in the following appendixes. However, the above content is not limited to the following description.

APPENDIX 1

A device for detecting circumventing behavior, including:

an estimation unit that estimates a degree of crowd congestion in relation to each of a plurality of partial areas of a target image; and a detection unit that detects circumventing behavior of a crowd by using a distribution state and a temporal transition of the degree of congestion estimated by the estimation unit.

APPENDIX 2

The device for detecting circumventing behavior according to Appendix 1, in which the detection unit detects a coexisting state of a target partial area which is continuously in a non-congested state with a degree of congestion lower than a threshold value and at least one of other partial areas not continuously in the non-congested state, and determines the target partial area as a location of a cause of circumvention in which the cause of the circumventing behavior is present.

APPENDIX 3

The device for detecting circumventing behavior according to Appendix 2, in which the detection unit specifies a target partial area which is continuously in the non-congested state by using the temporal transition of the degree of congestion, and determines whether or not there is at least one of other partial areas not continuously in the non-congested state while the target partial area is continuously in the non-congested state.

APPENDIX 4

The device for detecting circumventing behavior according to Appendix 2,
in which the detection unit
detects coexistence of a partial area exhibiting the non-congested state and at least one of other partial areas exhibiting a congested state with a degree of congestion higher than a threshold value based on the distribution state of the degree of congestion at a certain time point, and
determines whether or not the partial area exhibiting the non-congested state is continuously in the non-congested state by using the temporal transition of the degree of congestion.

APPENDIX 5

The device for detecting circumventing behavior according to any one of Appendixes 2 to 4,
in which the at least one of other partial areas is a plurality of partial areas around the target partial area.

APPENDIX 6

The device for detecting circumventing behavior according to any one of Appendixes 2 to 5,
in which the detection unit determines the threshold value by using a standard degree of congestion corresponding to a capturing time of the target image among standard degrees of congestion in the respective predetermined time units, set in relation to the partial area of the target image.

APPENDIX 7

The device for detecting circumventing behavior according to Appendix 6,
in which the standard degrees of congestion in the respective predetermined time units are set for each of the partial areas of the target image, and
in which the detection unit determines the threshold value for each partial area by using a standard degree of congestion corresponding to the capturing time of the target image and corresponding to each partial area among the standard degrees of congestion.

APPENDIX 8

The device for detecting circumventing behavior according to any one of Appendixes 2 to 7, further including:
an analysis unit that analyzes movement in the target image,
in which the detection unit determines the location of the cause of circumvention by further using movement information obtained by the analysis unit.

APPENDIX 9

The device for detecting circumventing behavior according to Appendix 8,
in which the detection unit
determines whether or not movement directions in other partial areas facing each other with the target partial area interposed therebetween are parallel to each other, and
determines the target partial area as the location of the cause of circumvention by using the determination result.

APPENDIX 10

The device for detecting circumventing behavior according to Appendix 8 or 9,
in which the detection unit
determines whether or not the at least one of other partial areas includes a separating partial area exhibiting a plurality of directions of movements of separating as the target partial area is being approached and a joining partial area exhibiting a plurality of directions of movements of joining while leaving behind the target partial area based on the movement information, and
determines the target partial area as the location of the cause of circumvention by using the determination result.

APPENDIX 11

The device for detecting circumventing behavior according to Appendix 8,
in which the detection unit
detects a coexisting state of a still region and parallel movement regions in which movement directions at facing positions with the still region interposed therebetween are parallel to each other in the target image by using the movement information,
confirms that a partial area corresponding to the still region is continuously in the non-congested state, and
determines the partial area corresponding to the still region as the location of the cause of circumvention based on the confirmation result.

APPENDIX 12

The device for detecting circumventing behavior according to Appendix 8,
in which the detection unit
detects a coexisting state of a still region and at least one of a separating region exhibiting a plurality of directions of movements of separating as the still region is being approached and a joining region exhibiting a plurality of directions of movements of joining while leaving behind the still region around the still region in the target image by using the movement information,
confirms that a partial area corresponding to the still region is continuously in the non-congested state, and
determines the partial area corresponding to the still region as the location of the cause of circumvention based on the confirmation result.

APPENDIX 13

The device for detecting circumventing behavior according to any one of Appendixes 2 to 12, further including:
an image processing unit that attaches a display element with which the location of the cause of circumvention can be specified on the target image based on position information of the partial area determined as the location of the cause of circumvention by the detection unit in the target image; and
a display processing unit that displays the target image attached with the display element on a display unit.

APPENDIX 14

The device for detecting circumventing behavior according to Appendix 13, further including:
an imaging instruction unit that causes an imaging device which can image the location of the cause of circumvention to zoom in on the location of the cause of circumvention in response to a user's operation on the target image displayed on the display unit.

APPENDIX 15

A device for processing cause of circumvention, including:
an image processing unit that attaches a display element with which a location of the cause of circumvention can be specified where the cause of circumventing behavior of people is present, on a target image; and
a display processing unit that displays the target image attached with the display element on a display unit.

APPENDIX 16

The device for processing cause of circumvention according to Appendix 15, further including:
an imaging instruction unit that causes an imaging device which can image the location of the cause of circumvention to zoom in on the location of the cause of circumvention in response to a user's operation on the target image displayed on the display unit.

APPENDIX 17

A method for detecting circumventing behavior executed by at least one computer, the method including:
estimating a degree of crowd congestion for each of a plurality of partial areas of a target image; and
detecting circumventing behavior of a crowd by using a distribution state and a temporal transition of the estimated degree of congestion.

APPENDIX 18

The method for detecting circumventing behavior according to Appendix 17,
in which the detection of the circumventing behavior includes
detecting a coexisting state of a target partial area which is continuously in a non-congested state with a degree of congestion lower than a threshold value and at least one of other partial areas not continuously in the non-congested state, and
determining the target partial area as a location of a cause of circumvention in which the cause of the circumventing behavior is present.

APPENDIX 19

The method for detecting circumventing behavior according to Appendix 18,
in which the detection of the state includes
specifying a target partial area which is continuously in the non-congested state by using the temporal transition of the degree of congestion, and
determining whether or not there is at least one of other partial areas not continuously in the non-congested state while the target partial area is continuously in the non-congested state.

APPENDIX 20

The method for detecting circumventing behavior according to Appendix 18,
in which the detection of the state includes
detecting coexistence of a partial area exhibiting the non-congested state, and at least one of other partial areas exhibiting a congested state with a degree of congestion higher than a threshold value based on the distribution state of the degree of congestion at a certain time point, and
determining whether or not the partial area exhibiting the non-congested state is continuously in the non-congested state by using the temporal transition of the degree of congestion.

APPENDIX 21

The method for detecting circumventing behavior according to any one of Appendixes 18 to 20,
in which the at least one of other partial areas includes a plurality of partial areas around the target partial area.

APPENDIX 22

The method for detecting circumventing behavior according to any one of Appendixes 18 to 21,
in which the detection of the state includes determining the threshold value by using a standard degree of congestion corresponding to a capturing time of the target image among standard congestion degrees in the respective predetermined time units, set in relation to the partial area of the target image.

APPENDIX 23

The method for detecting circumventing behavior according to Appendix 22,
in which the standard degrees of congestion in the respective predetermined time units are set for each of the partial areas of the target image, and
in which the determining of the threshold value includes determining the threshold value for each partial area by using a standard degree of congestion corresponding to the capturing time of the target image and corresponding to each partial area among the standard degrees of congestion.

APPENDIX 24

The method for detecting circumventing behavior according to any one of Appendixes 18 to 23, further including:
analyzing movement in the target image,
in which the detection of the circumventing behavior includes determining the location of the cause of circumvention by further using the obtained movement information.

APPENDIX 25

The method for detecting circumventing behavior according to Appendix 24,
in which the detection of the circumventing behavior further includes determining whether or not movement directions in other partial areas facing each other with the target partial area interposed therebetween are parallel to each other based on the movement information, and in which the target partial area is determined as the location of the cause of circumvention by using the determination result.

APPENDIX 26

The method for detecting circumventing behavior according to Appendix 24 or 25,
in which the detection of the circumventing behavior further includes determining whether or not the at least one of other partial areas includes at least one of a separating partial area exhibiting a plurality of directions of movements of separating as the target partial area is being approached and a joining partial area exhibiting a plurality of directions of movements of joining while leaving behind the target partial area based on the movement information, and
in which the target partial area is determined as the location of the cause of circumvention by using the determination result.

APPENDIX 27

The method for detecting circumventing behavior according to Appendix 24,
in which the detection of the circumventing behavior further includes
detecting a coexisting state of a still region and parallel movement regions in which movement directions at facing positions with the still region interposed therebetween are parallel to each other in the target image by using the movement information; and
confirming that a partial area corresponding to the still region is continuously in the non-congested state, and
in which the partial area corresponding to the still region is determined as the location of the cause of circumvention based on the confirmation result.

APPENDIX 28

The method for detecting circumventing behavior according to Appendix 24,
in which the detection of the circumventing behavior further includes
detecting a coexisting state of a still region and at least one of a separating region exhibiting a plurality of directions of movements of separating as the still region is being approached and a joining region exhibiting a plurality of directions of movements of joining while leaving behind the still region around the still region in the target image by using the movement information; and
confirming that a partial area corresponding to the still region is continuously in the non-congested state, and
in which the partial area corresponding to the still region is determined as the location of the cause of circumvention based on the confirmation result.

APPENDIX 29

The method for detecting circumventing behavior according to any one of Appendixes 18 to 28, further including:
attaching a display element with which the location of the cause of circumvention can be specified on the target image based on position information of the partial area determined as the location of the cause of circumvention in the target image; and
displaying the target image attached with the display element on a display unit.

APPENDIX 30

The method for detecting circumventing behavior according to Appendix 29, further including:
causing an imaging device which can image the location of the cause of circumvention to zoom in on the location of the cause of circumvention in response to a user's operation on the target image displayed on the display unit.

APPENDIX 31

A method for processing cause of circumvention executed by at least one computer, the method including:
attaching a display element with which a location of a cause of circumvention can be specified where the cause of circumventing behavior of a crowd is present, on a target image; and
displaying the target image attached with the display element on a display unit.

APPENDIX 32

The method for processing cause of circumvention according to Appendix 31, further including:
causing an imaging device which can image the location of the cause of circumvention to zoom in on the location of the cause of circumvention in response to a user's operation on the target image displayed on the display unit.

APPENDIX 33

A recording medium recording a program causing at least one computer to execute the method for detecting circumventing behavior according to any one of Appendixes 17 to 30 or the method for processing cause of circumvention according to Appendix 31 or 32, or recording the program in a computer readable manner.

APPENDIX 34

An information processing device including:
an estimation unit that estimates a degree of congestion of a partial region of an image; and
a detection unit that detects a predefined behavior by using temporal transitions of degrees of congestion of a plurality of partial regions, estimated by the estimation unit.

APPENDIX 35

An information processing device including:
an image processing unit that attaches an indicator indicating a region where an circumventing behavior is occurring to an image; and
a display unit that displays the image attached with the indicator.

APPENDIX 36

A method including:
estimating a degree of congestion of a partial region of an image; and
detecting a predefined behavior by using temporal transitions of the estimated degrees of congestion of a plurality of partial regions.

APPENDIX 37

A method including:
attaching an indicator indicating a region where an circumventing behavior is occurring to an image; and
displaying the image attached with the indicator.

APPENDIX 38

A recording medium recording a program causing a computer to execute the method according to Appendix 36 or 37, or recording the program in a computer readable manner.

This application is based upon and claims the benefit of priority from Japanese Patent Application No. 2013-233493, filed Nov. 11, 2013; the entire contents of which are incorporated herein by reference.

The invention claimed is:

1. A device for detecting circumventing behavior, comprising:
an estimation unit that estimates a degree of crowd congestion in relation to each of a plurality of partial areas of a target image; and
a detection unit that detects circumventing behavior of a crowd by using a distribution state and a temporal transition of the degree of congestion estimated by the estimation unit.

2. The device for detecting circumventing behavior according to claim 1,
wherein the detection unit
detects a coexisting state of a target partial area which is continuously in a non-congested state with a degree of congestion lower than a threshold value and at least one of other partial areas not continuously in the non-congested state, and
determines the target partial area as a location of a cause of circumvention in which the cause of the circumventing behavior is present.

3. The device for detecting circumventing behavior according to claim 2,
wherein the detection unit
specifies a target partial area which is continuously in the non-congested state by using the temporal transition of the degree of congestion, and
determines whether or not at least one of other partial areas not continuously in the non-congested state is present while the target partial area is continuously in the non-congested state.

4. The device for detecting circumventing behavior according to claim 2,
wherein the detection unit
detects coexistence of a partial area exhibiting the non-congested state and at least one of other partial areas exhibiting a congested state with a degree of congestion higher than a threshold value based on the distribution state of the degree of congestion at a certain time point, and
determines whether or not the partial area exhibiting the non-congested state is continuously in the non-congested state by using the temporal transition of the degree of congestion.

5. The device for detecting circumventing behavior according to claim 2,
wherein the at least one of other partial areas is a plurality of partial areas around the target partial area.

6. The device for detecting circumventing behavior according to claim 2,
wherein the detection unit determines the threshold value by using a standard degree of congestion corresponding to a capturing time of the target image among standard degrees of congestion in respective predetermined time units, set in relation to the partial area of the target image.

7. The device for detecting circumventing behavior according to claim 6,
wherein the standard degrees of congestion in the respective predetermined time units are set for each of the partial areas of the target image, and
wherein the detection unit determines the threshold value for each partial area by using a standard degree of congestion corresponding to the capturing time of the target image and corresponding to each partial area among the standard degrees of congestion.

8. The device for detecting circumventing behavior according to claim 2, further comprising:
an analysis unit that analyzes movement in the target image,
wherein the detection unit determines the location of the cause of circumvention by further using movement information obtained by the analysis unit.

9. The device for detecting circumventing behavior according to claim 8,
wherein the detection unit
determines whether or not movement directions in other partial areas, facing each other with the target partial area interposed therebetween, are parallel to each other, and
determines the target partial area as the location of the cause of circumvention by using the determination result.

10. The device for detecting circumventing behavior according to claim 8,
wherein the detection unit
determines whether or not the at least one of other partial areas includes a separating partial area exhibiting a plurality of directions of movements of separating as the target partial area is being approached and a joining partial area exhibiting a plurality of directions of movements of joining while leaving behind the target partial area based on the movement information, and
determines the target partial area as the location of the cause of circumvention by using the determination result.

11. The device for detecting circumventing behavior according to claim 8,
wherein the detection unit
detects a coexisting state of a still region and parallel movement regions in which movement directions at facing positions with the still region interposed therebetween are parallel to each other in the target image by using the movement information,
confirms that a partial area corresponding to the still region is continuously in the non-congested state, and
determines the partial area corresponding to the still region as the location of the cause of circumvention based on the confirmation result.

12. The device for detecting circumventing behavior according to claim 8,
wherein the detection unit
detects a coexisting state of a still region and at least one of a separating region exhibiting a plurality of directions of movements of separating as the still region is being approached and a joining region exhibiting a plurality of directions of movements of joining while leaving behind the still region around the still region in the target image by using the movement information, confirms that a partial area corresponding to the still region is continuously in the non-congested state, and determines the partial area corresponding to the still region as the location of the cause of circumvention based on the confirmation result.

13. The device for detecting circumventing behavior according to claim 2, further comprising:
an image processing unit that attaches a display element with which the location of the cause of circumvention can be specified on the target image based on position information of the partial area determined as the location of the cause of circumvention by the detection unit in the target image; and
a display processing unit that displays the target image attached with the display element on a display unit.

14. The device for detecting circumventing behavior according to claim 13, further comprising:
an imaging instruction unit that causes an imaging device which can image the location of the cause of circumvention to zoom in on the location of the cause of circumvention in response to a user's operation on the target image displayed on the display unit.

15. A device for processing cause of circumvention, comprising:
an image processing unit that attaches a display element with which a location of the cause of circumvention can be specified where the cause of circumventing behavior of a crowd is present, on a target image; and
a display processing unit that displays the target image attached with the display element on a display unit.

16. The device for processing cause of circumvention according to claim 15, further comprising:
an imaging instruction unit that causes an imaging device which can image the location of the cause of circumvention to zoom in on the location of the cause of circumvention in response to a user's operation on the target image displayed on the display unit.

17. A method of detecting circumventing behavior executed by at least one computer, the method comprising:
estimating a degree of crowd congestion for each of a plurality of partial areas of a target image; and
detecting circumventing behavior of a crowd by using a distribution state and a temporal transition of the estimated degree of congestion.

18. A method for processing cause of circumvention executed by at least one computer, the method comprising:
attaching a display element with which a location of a cause of circumvention can be specified where the cause of circumventing behavior of a crowd is present, on a target image; and
displaying the target image attached with the display element on a display unit.

19. A non-transitory computer medium storing a program, the program causing at least one computer to execute a method for detecting circumventing behavior, the method comprising:
estimating a degree of crowd congestion for each of a plurality of partial areas of a target image; and
detecting circumventing behavior of a crowd by using a distribution state and a temporal transition of the estimated degree of congestion.

20. A non-transitory computer medium storing a program, the program causing at least one computer to execute a method for processing cause of circumvention, the method comprising:
attaching a display element with which a location of a cause of circumvention can be specified where the cause of circumventing behavior of a crowd is present, on a target image; and
displaying the target image attached with the display element on a display unit.

* * * * *